US011929027B2

(12) United States Patent
Kim et al.

(10) Patent No.: US 11,929,027 B2
(45) Date of Patent: Mar. 12, 2024

(54) DISPLAY DEVICE

(71) Applicant: LG DISPLAY CO., LTD., Seoul (KR)

(72) Inventors: Seongkwang Kim, Gyeonggi-do (KR); Sungman Han, Gyeonggi-do (KR); Kihyung Lee, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/988,803

(22) Filed: Nov. 17, 2022

(65) Prior Publication Data

US 2023/0169921 A1 Jun. 1, 2023

(30) Foreign Application Priority Data

Nov. 26, 2021 (KR) ........................ 10-2021-0165345

(51) Int. Cl.
*G09G 3/3233* (2016.01)

(52) U.S. Cl.
CPC ... *G09G 3/3233* (2013.01); *G09G 2300/0426* (2013.01); *G09G 2300/0439* (2013.01); *G09G 2300/0809* (2013.01); *G09G 2330/08* (2013.01); *G09G 2330/10* (2013.01)

(58) Field of Classification Search
CPC ........... H10K 59/00–95; H10K 71/861; H10K 59/126; H10K 59/131; H10K 59/123; H10K 59/124; G06F 3/041–047; G06F 2203/041–04114; G09G 3/3233; G09G 2330/08; G09G 2330/10; G09G 2300/0413; G09G 2300/0426; G09G 3/3225; G09G 3/32; G09G 3/3208; G09G 2330/04; G02F 1/136259; G02F 1/1309; G02F 1/136272; G02F 1/136263
See application file for complete search history.

(56) References Cited

U.S. PATENT DOCUMENTS

2015/0161943 A1* 6/2015 Shim .................... G09G 3/3225 345/76

FOREIGN PATENT DOCUMENTS

| | | | | |
|---|---|---|---|---|
| KR | 20200079740 A | * | 5/2015 | ....... G02F 1/136259 |
| KR | 20150055293 A | * | 7/2020 | ............. H10K 71/61 |

* cited by examiner

*Primary Examiner* — Sanjiv D. Patel
(74) *Attorney, Agent, or Firm* — POLSINELLI PC

(57) ABSTRACT

A display device includes a first driving transistor of a first subpixel, a second driving transistor of a second subpixel, a first shield metal, a second shield metal, a buffer layer, and an interlayer insulating film; a first source electrode included in the first driving transistor is positioned on or over the interlayer insulating film and electrically connected to the first shield metal through first holes in the interlayer insulating film and the buffer layer; a second source electrode included in the second driving transistor is positioned on or over the interlayer insulating film and electrically connected to the second shield metal through second holes in the interlayer insulating film and the buffer layer; a welding repair line is positioned between the buffer layer and the interlayer insulating film to overlap with at least a part of the first shield metal and be electrically connected to the second source electrode through a hole in the interlayer insulating film.

20 Claims, 18 Drawing Sheets

DISPLAY DEVICE

CROSS-REFERENCE TO RELATED APPLICATION

This application claims the priority of Korean Patent Application No. 10-2021-0165345, filed on Nov. 26, 2021, which is hereby incorporated by reference in its entirety.

BACKGROUND

Field of the Disclosure

The present disclosure relates to a display device.

Description of the Background

In fabrication of display panels, a range of defects can occur due to a variety of reasons, for example, when a foreign matter is present in various positions of a subpixel so that the subpixel forms a brightened point or a darkened point. For example, a driving transistor in each of subpixels is formed through a variety of operations. Here, minute process-induced matter may be present in the driving transistor. When the driving transistor has a foreign matter in this manner, a short between nodes may be caused by the foreign matter, and abnormal current having a significantly large magnitude may flow through the driving transistor. Due to such a phenomenon, the subpixel may form a brightened point that is abnormally bright and thus be a defective subpixel.

Therefore, a performing repair processing to a subpixel when the subpixel is determined to be defective has been developed. However, there have been problems in a reduced aperture ratio and a reduced usable area in which other essential components need to be disposed. Due to such problems, it has not been easy to realize high resolution using a display panel having such a repair structure.

SUMMARY

Accordingly, the present disclosure is directed to a display device that substantially obviates one or more of problems due to limitations and disadvantages described above.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described, a display device includes a first subpixel including a first emitting device, a first driving transistor, a first scan transistor, and a first storage capacitor; and a second subpixel disposed adjacent to the first subpixel and including a second emitting device, a second driving transistor, a second scan transistor, and a second storage capacitor.

In the present disclosure, a display device includes a repair structure which does not occupy a large space while not causing a decrease in the aperture ratio, as well as a subpixel structure for the repair structure.

A display device also includes a repair structure that does not cause a decrease in the aperture ratio.

A display device also includes a repair structure that does not occupy a large space and a subpixel structure for the repair structure.

A display device also includes a repair structure suitable for high-resolution realization.

A display device also includes a shield structure able to prevent a pixel electrode positioned above a welding repair line (e.g., a welding repair wire) from being damaged by welding processing when the welding repair line is welded.

The structure of the second subpixel may have a flip shape (i.e. be inverted) with respect to the structure of the first subpixel. For example, the structure of each of the subpixels may include the positions and/or shapes of the circuit devices (e.g., the driving transistor, the scan transistor, and the storage capacitor).

Thus, the first driving transistor and the second driving transistor may be positioned between the first scan transistor and the second scan transistor.

In another aspect of the present disclosure, a display device includes a first shield metal positioned below the first driving transistor; a second shield metal positioned below the second driving transistor; a buffer layer disposed on or over the first shield metal and the second shield metal; and an interlayer insulating film disposed over the buffer layer.

In another aspect of the present disclosure, a display device include a first source electrode included in the first driving transistor, positioned on or over the interlayer insulating film, and electrically connected to the first shield metal through first holes in the interlayer insulating film and the buffer layer; and a second source electrode included in the second driving transistor, positioned on or over the interlayer insulating film, and electrically connected to the second shield metal through second holes in the interlayer insulating film and the buffer layer.

In another aspect of the present disclosure, a display device include a welding repair line positioned between the buffer layer and the interlayer insulating film, wherein the welding repair line includes a first portion overlapping with at least a part of the first shield metal, a second portion electrically connected to the second source electrode through a hole in the interlayer insulating film, and a third portion positioned between the first portion and the second portion.

In a further aspect of the present disclosure, a display device includes a substrate; a first shield metal on or over the substrate; a buffer layer on or over the first shield metal; an interlayer insulating film over the buffer layer; a first source electrode included in the first driving transistor, positioned on or over the interlayer insulating film, and electrically connected to the first shield metal through first holes in the interlayer insulating film and the buffer layer; an insulating layer on or over the first source electrode; a first pixel electrode positioned on or over the insulating layer and electrically connected to the first source electrode through a hole in the insulating layer; and a welding repair line positioned between the buffer layer and the interlayer insulating film, with a portion of the welding repair line being interposed between the first shield metal and the first source electrode.

The portion of the welding repair line interposed between the first shield metal and the first source electrode may overlap with at least a part of the first pixel electrode.

The display device may include the repair structure that does not cause a decrease in the aperture ratio.

The display device may include the repair structure that does not occupy a large space and the subpixel structure for the repair structure.

The display device may include the repair structure suitable for high-resolution realization.

The display device may include the shield structure able to prevent the pixel electrode PE positioned above the welding repair line from being damaged by welding processing when the welding repair line is welded.

It is to be understood that both the foregoing general description and the following detailed description are exemplary and explanatory and are intended to provide further explanation of the disclosure as claimed.

BRIEF DESCRIPTION OF THE DRAWINGS

The above and other features and advantages of the present disclosure will be more clearly understood from the following detailed description, taken in conjunction with the accompanying drawings, in which.

DETAILED DESCRIPTION

Figure 1:
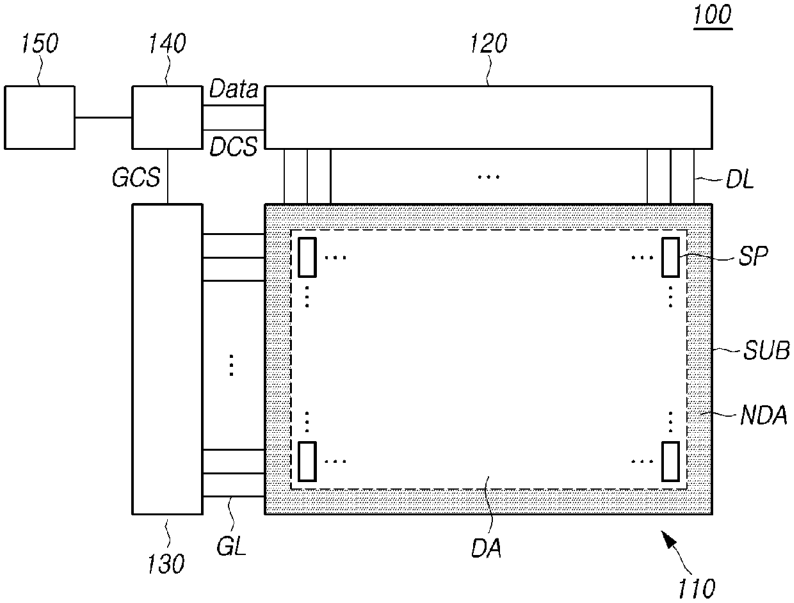
FIG. 1 is a diagram illustrating a system configuration of a display device according to the present disclosure.

In the following description of examples or aspects of the present disclosure, reference will be made to the accompanying drawings in which it is shown by way of illustration specific examples or aspects that can be implemented, and in which the same reference numerals and signs can be used to designate the same or like components even when they are shown in different accompanying drawings from one another. Further, in the following description of examples or aspects of the present disclosure, detailed descriptions of well-known functions and components incorporated herein will be omitted when it is determined that the description may make the subject matter in some aspects of the present disclosure rather unclear. The terms such as "including", "having", "containing", "constituting", "made up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps with" etc. a second element, it should be interpreted that, not only can the first element "be directly connected or coupled to" or "directly contact or overlap with" the second element, but a third element can also be "interposed" between the first and second elements, or the first and second elements can "be connected or coupled to", "contact or overlap with", etc. each other via a fourth element. Here, the second element may be included in at least one of two or more elements that "are connected or coupled to", "contact or overlap with", etc. each other.

Hereinafter, a variety of aspects will be described in detail with reference to the accompanying drawings.

FIG. 1 is a diagram illustrating a system configuration of a display device 100 according to the present disclosure.

Referring to FIG. 1, a display driving system of the display device 100 according to the present disclosure may include a display panel 110 and a display driver circuit driving the display panel 110.

The display panel 110 may include a display area DA on which images are displayed and a non-display area NDA on which images are not displayed. The display panel 110 may include a plurality of subpixels SP disposed on a substrate SUB in order to display images. For example, the plurality of subpixels SP may be disposed in the display area DA. In some cases, at least one subpixel SP may be disposed in the non-display area NDA. The at least one subpixel SP disposed in the non-display area NDA will also be referred to as a dummy subpixel.

The display panel 110 may include a plurality of signal lines disposed on or over the substrate SUB to drive the plurality of subpixels SP. For example, the plurality of signal lines may include data lines DL, gate lines GL, drive voltage lines, and the like.

The plurality of data lines DL may intersect the plurality of gate lines GL. Each of the plurality of data lines DL may be arranged to extend in a first direction. Each of the plurality of gate lines GL may be arranged to extend in a direction intersecting the first direction. Here, the first direction may be a column direction, whereas the direction intersecting the first direction may be a row direction.

The display driver circuit may include a data driver circuit 120 and a gate driver circuit 130, and also include a controller 140 to drive the data driver circuit 120 and the gate driver circuit 130.

The data driver circuit 120 may output data signals (also referred to as data voltages) corresponding to image signals to the plurality of data lines DL. The gate driver circuit 130 may generate gate signals and output the gate signals to the plurality of gate lines GL. The controller 140 may convert image data input from an external host 150 into image data having a data signal format readable by the data driver circuit 120, and supply the image data to the data driver circuit 120.

The data driver circuit 120 may include one or more source driver integrated circuits (SDICs). For example, each of the SDICs may be connected to the display panel 110 by a tape-automated bonding (TAB) method, connected to a bonding pad of the display panel 110 by a chip-on-glass (COG) method or a chip on panel (COP) method, or implemented as a chip-on-film (COF) structure connected to the display panel 110.

The gate driver circuit 130 may be connected to the display panel 110 by a TAB method, connected to a bonding pad of the display panel 110 by a COG method or a COP method, connected to the display panel 110 by a COF method, or formed in the non-display area NDA of the display panel 110 by a gate-in-panel (GIP) method.

The display device 100 according to the present disclosure may be a self-emissive display device in which the display panel 110 emits light by itself. When the display device 100 according to the present disclosure is a self-emissive display device, each of the plurality of subpixels SP may include an emitting device. For example, the display device 100 according to the present disclosure may be an organic light-emitting display device in which the emitting device is implemented as an organic light-emitting diode (OLED). In another example, the display device 100 according to the present disclosure may be an inorganic light-emitting display device in which the emitting device is implemented as an OLED based on an inorganic material. In another example, the display device 100 according to the present disclosure may be a quantum dot display device in which the emitting device is implemented as a quantum dot that is a self-emissive semiconductor crystal.

Figure 2:
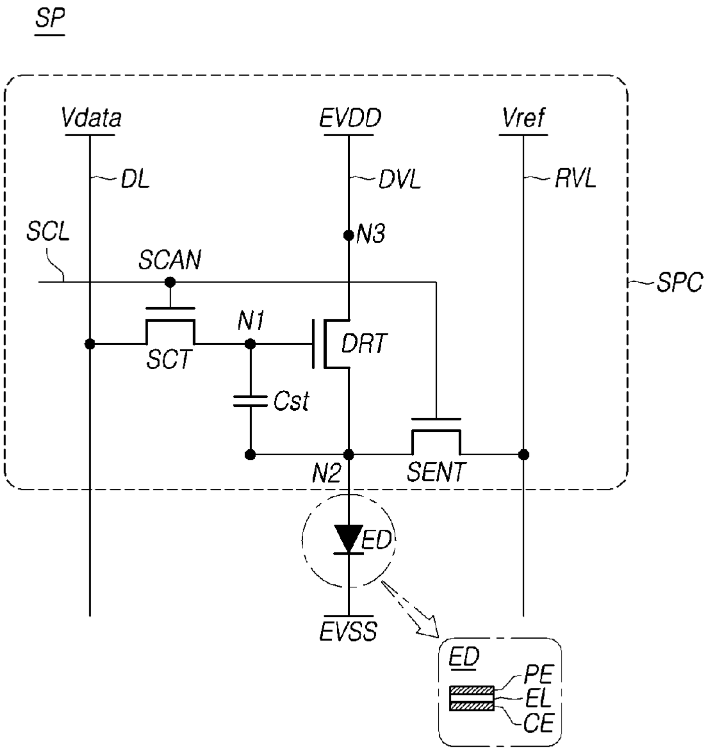
FIG. 2 illustrates an equivalent circuit of a subpixel in the display device according to the present disclosure.

FIG. 2 illustrates an equivalent circuit of a subpixel SP in the display device 100 according to the present disclosure.

Referring to FIG. 2, in the display device 100 according to the present disclosure, each of the subpixels SP includes an emitting device ED and a pixel driver circuit SPC to drive the emitting device ED. The pixel driver circuit SPC may include a driving transistor DRT, a scan transistor SCT, and a storage capacitor Cst.

The driving transistor DRT may drive the emitting device ED by controlling a current flowing through the emitting device ED. The scan transistor SCT may transfer a data voltage Vdata to a first node N1, i.e., a gate node, of the driving transistor DRT. The storage capacitor Cst may be configured to maintain a voltage for a predetermined time.

The emitting device ED may include a pixel electrode PE, a common electrode CE, and an emissive layer EL positioned between the pixel electrode PE and the common electrode CE. The pixel electrode PE may be an anode (or a cathode), and may be electrically connected to a second node N2 of the driving transistor DRT. The common electrode CE may be a cathode (or an anode), and a base voltage EVSS may be applied to the common electrode CE. The emitting device ED may be, for example, an organic light-emitting diode (OLED), a light-emitting diode (LED) based on an inorganic material, a quantum dot emitting device, or the like.

The driving transistor DRT may be a transistor to drive the emitting device ED, and may include the first node N1, the second node N2, and a third node N3.

The first node N1 may be a gate node, and may be electrically connected to a source node or a drain node of the scan transistor SCT. The second node N2 may be a source node or a drain node, and may be electrically connected to the pixel electrode PE of the emitting device ED. The third node N3 may be a drain node or a source node, and may be electrically connected to a driving voltage line DVL through which a driving voltage EVDD is supplied. Hereinafter, for the sake of brevity, the second node N2 will be described as being a source node, whereas the third node N3 will be described as being a drain node.

The scan transistor SCT may switch the connection between a data line DL and the first node N1 of the driving transistor DRT. The scan transistor SCT may control the connection between the first node N1 of the driving transistor DRT and a corresponding data line DL among the plurality of data lines DL in response to a scan signal SCAN supplied through a scan line SCL, i.e., a type of gate line GL.

The drain node or the source node of the scan transistor SCT may be electrically connected to the corresponding data line DL. The source node or the drain node of the scan transistor SCT may be electrically connected to the first node N1 of the driving transistor DRT. The gate node of the scan transistor SCT may be electrically connected to the scan signal line SCL to receive the scan signal SCAN applied therethrough.

The scan transistor SCT may be turned on by the scan signal SCAN having a turn-on level voltage to transfer the data voltage Vdata, supplied from the corresponding data line DL, to the first node N1 of the driving transistor DRT. The storage capacitor Cst may be provided between the first node N1 and the second node N2 of the driving transistor DRT.

Referring to FIG. 2, in the display device 100 according to the present disclosure, the pixel driver circuit SPC of each of the subpixels SP may further include a sensing transistor SENT.

The sensing transistor SENT may switch the connection between the second node N2 of the driving transistor DRT and a reference voltage line RVL to which a reference voltage Vref is applied.

The sensing transistor SENT may control the connection between the second node N2 of the driving transistor DRT electrically connected to the pixel electrode PE of the emitting device ED and a corresponding reference voltage line RVL among a plurality of reference voltage lines RVL in response to the scan signal SCAN supplied through the scan line SCL. In FIG. 2, the gate node of the sensing transistor SENT and the gate node of the scan transistor SCT are connected to the same scan line SCL. However, this is for illustrative purposes only, and the gate node of the sensing transistor SENT and the gate node of the scan transistor SCT may be connected to different scan lines SCL, respectively.

The drain node or the source node of the sensing transistor SENT may be electrically connected to the reference voltage line RVL. The source node or the drain node of the sensing transistor SENT may be electrically connected to the second node N2 of the driving transistor DRT, and be electrically connected to the pixel electrode PE of the emitting device ED. The gate node of the sensing transistor SENT may be electrically connected to the scan line SCL to receive the scan signal SCAN applied therethrough.

Each of the driving transistor DRT, the scan transistor SCT, and the sensing transistor SENT may be an N-type transistor or a P-type transistor.

The 3T1C structure of the subpixel SP illustrated in FIG. 2 is only an example given for explanation. Rather, the subpixel structure may only include two transistors and one capacitor, further include one or more transistors, or further include one or more capacitors. In addition, all of the plurality of subpixels may have the same structure, or some of the plurality of subpixels may have a different structure.

In addition, the display device 100 according to the present disclosure may have a top emission structure or a bottom emission structure. Hereinafter, as an example, the display device 100 will be described as having a top emission structure.

In addition, the display device 100 according to the present disclosure may have a repair structure to repair a subpixel SP among the plurality of subpixels SP when the subpixel has a defect and does not properly operate. Hereinafter, a subpixel SP having a defect will be referred to as a bad subpixel Bad SP, and a subpixel SP having no defect will be referred to as a normal subpixel Normal SP.

The repair in the display device 100 according to the present disclosure may be a method of normalizing the bad subpixel Bad SP. The repair in the display device 100 according to the present disclosure may include stopping the operation of the pixel driver circuit SPC of the bad subpixel Bad SP and driving the emitting device ED of the bad subpixel Bad SP using the pixel driver circuit SPC of the normal subpixel Normal SP, thereby enabling light to be emitted from the bad subpixel Bad SP.

The repair in the display device 100 according to the present disclosure may include cutting repair and welding repair.

The cutting repair may be a process of cutting a major point (e.g., a cutting point) in the pixel driver circuit SPC that may stop the operation of the pixel driver circuit SPC of the bad subpixel Bad SP.

The welding repair may be a process of welding a major point (e.g., a welding point) by which the pixel driver circuit SPC of the normal subpixel Normal SP and the pixel electrode PE of the emitting device ED may be electrically connected.

Figure 3:
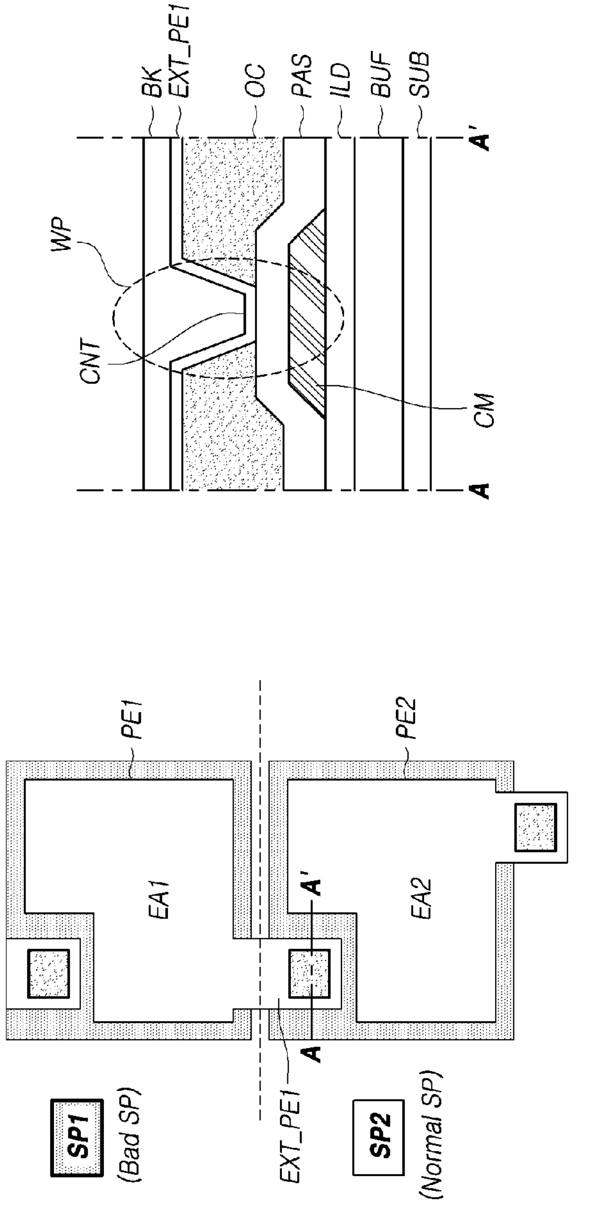
FIG. 3 illustrates a repair structure of the display device according to the present disclosure.
Figure 4:
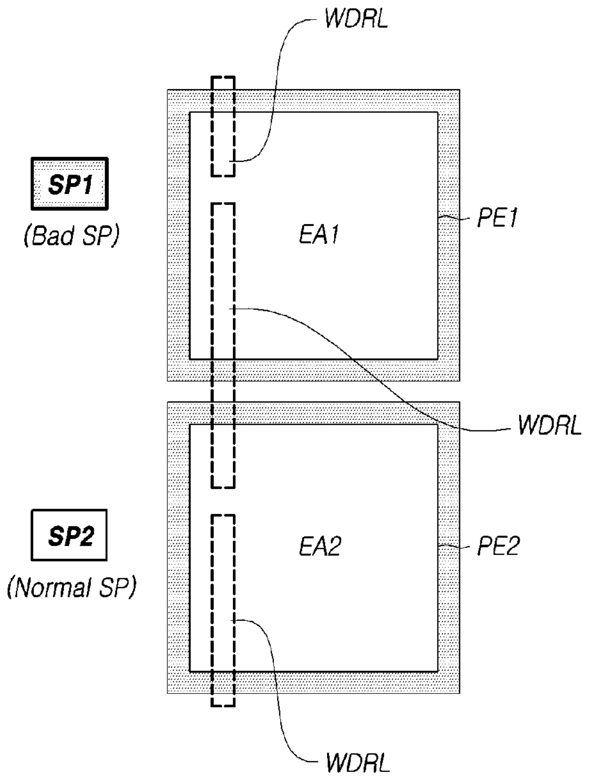
FIG. 4 illustrates a repair structure of the display device according to the present disclosure.

FIGS. 3 and 4 illustrate a repair structure of the display device 100 according to the present disclosure. In FIGS. 3 and 4, it should be assumed that the first subpixel SP1 is a bad subpixel Bad SP and the second subpixel SP2 is a normal subpixel Normal SP.

Referring to FIGS. 3 and 4, a first subpixel SP1 may include a first pixel electrode PE1 of the emitting device ED, and a second subpixel SP2 may include a second pixel electrode PE2 of the emitting device ED. The first subpixel SP1 may have a first emitting area EA1, the size of which corresponds to the area size of the first pixel electrode PE1, whereas the second subpixel SP2 may have a second emitting area EA2, the size of which corresponds to the area size of the second pixel electrode PE2.

The repair according to the present disclosure may be performed by at least one of a top repair method performed on the top of a substrate SUB on which pixel electrodes PE are patterned (see FIG. 3) and a bottom repair method performed on the bottom of a substrate SUB (see FIG. 4).

Referring to FIG. 3, in the top repair method, the welding repair may be performed for the pixel electrode PE. In this regard, the first pixel electrode PE1 of the first subpixel SP1 may include an extension EXT_PE1 extending to the area of the second subpixel SP2.

A connecting metal CM may be disposed below the extension EXT_PE1 of the first pixel electrode PE1. A passivation film PAS and an overcoat layer OC may be disposed between the extension EXT_PE1 of the first pixel electrode PE1 and the connecting metal CM.

The extension EXT_PE1 of the first pixel electrode PE1 may include a contact portion CNT in contact with the top surface of the passivation film PAS through a hole of the overcoat layer OC.

The contact portion CNT of the extension EXT_PE1 of the first pixel electrode PE1 may be positioned at a welding point at which the welding repair is performed.

Before the welding repair, the contact portion CNT of the extension EXT_PE1 of the first pixel electrode PE1 may be electrically disconnected from the connecting metal CM.

After the welding repair, the contact portion CNT of the extension EXT_PE1 of the first pixel electrode PE1 may be electrically connected to the connecting metal CM.

The connecting metal CM may be a portion of the pixel driver circuit SPC of the second subpixel SP2, or may be a metal electrically connected to the pixel driver circuit SPC of the second subpixel SP2.

For example, the connecting metal CM may be a second node N2 of the driving transistor DRT or a second pixel electrode PE2 of the second subpixel SP2. Alternatively, the connecting metal CM may be electrically connected to the second node N2 of the driving transistor DRT of the second subpixel SP2, or may be electrically connected to the second pixel electrode PE2.

Thus, after the welding repair, when the contact portion CNT of the extension EXT_PE1 of the first pixel electrode PE1 is electrically connected to the connecting metal CM, the first pixel electrode PE1 of the first subpixel SP1 may be supplied with driving current from the driving transistor DRT of the second subpixel SP2.

In addition, in the top repair method, the welding repair for the first pixel electrode PE1 is required to be performed, and an extension ePEP formed by extending the first pixel electrode PE1 of the first subpixel SP1 is required to intrude into a welding point WP in the area of the second subpixel SP2. Thus, the area size of the emitting area EA2 is necessarily reduced by the size of the extension ePEP of the first pixel electrode PE1 intruded into the welding point WP. Consequently, when the display device 100 according to the present disclosure has the welding repair structure based on the top repair method, the aperture ratio may be reduced.

Referring to FIG. 4, in the bottom repair method, the display device 100 according to the present disclosure may include welding repair lines WDRL positioned below the pixel electrodes PE1 and PE2 in order to prevent the aperture ratio from being reduced.

The welding repair lines WDRL are required to pass through a significant portion of the entire area of each of the subpixels SP1 and SP2, thereby reducing a space in which the pixel driver circuit SPC of each of the subpixels SP1 and SP2 may be disposed.

In the case of a high-resolution display device 100, the size of a single subpixel SP is significantly reduced, and thus a circuit layout area in which the pixel driver circuit SPC may be disposed is significantly reduced.

When the circuit layout area is reduced by the welding repair lines WDRL and is further reduced due to high resolution requirements, it may be impossible to dispose the pixel driver circuit SPC requiring a predetermined space.

Thus, it may be difficult to use the bottom repair method in the high-resolution display device 100.

Accordingly, aspects of the present disclosure provide a repair structure capable of preventing a reduction in the aperture ratio and realizing a high resolution in the top emission structure, and a flip structure of the sub-pixels SP therefor.

Figure 5:
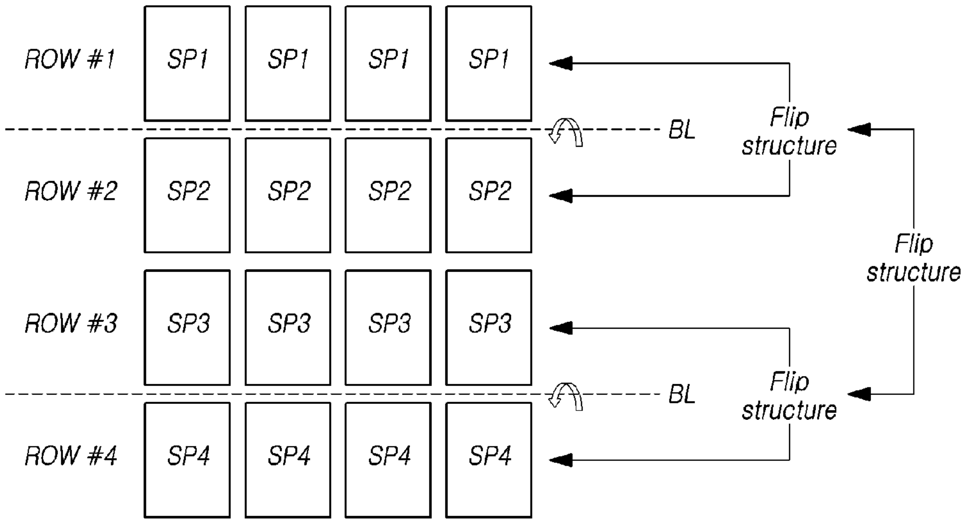
FIG. 5 illustrates a flip structure of the subpixels in the display device according to the present disclosure.
Figure 6:
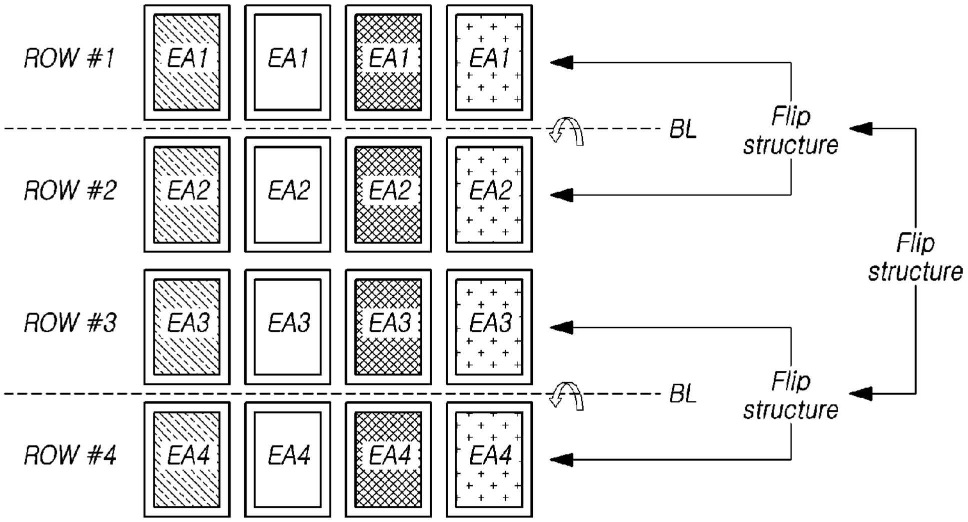
FIG. 6 illustrates a layout of the subpixels having a top emission structure in the display device according to the present disclosure.

FIG. 5 illustrates a flip structure of the subpixels SP in the display device 100 according to the present disclosure, and FIG. 6 illustrates a layout of the subpixels SP having the top emission structure in the display device 100 according to the present disclosure.

Referring to FIG. 5, in the flip structure of the subpixels SP in the display device 100 according to the present disclosure, two subpixels SP adjacent to each other in the vertical direction may be inverted with respect to each other.

Referring to FIG. 5, the structure of first subpixels SP1 in a first subpixel row ROW #1 and the structure of second subpixels SP2 in a second subpixel row ROW #2 may be inverted with respect to each other (i.e., a flip shape). Here, the structure of each of the first subpixels SP1 may include, for example, positions and/or shapes of devices (e.g., DRT, SCT, SENT, and Cst) in the pixel driver circuit SPC in each of the first subpixels SP1. The structure of each of the second subpixels SP2 may include, for example, positions and/or shapes of devices (e.g., DRT, SCT, SENT, and Cst) in the pixel driver circuit SPC in each of the second subpixels SP2.

Referring to FIG. 5, the structure of third subpixels SP3 in a third subpixel row ROW #3 and the structure of fourth subpixels SP4 in a fourth subpixel row ROW #4 may be inverted with respect to each other (i.e., a flip shape).

As described above, referring to FIG. 5, the structure of the first subpixel row ROW #1 and the second subpixel row ROW #2 and the structure of the third subpixel row ROW #3 and the fourth subpixel row ROW #4 may be inverted with respect to each other (i.e., a flip shape). Thus, referring to FIG. 5, the structure of the second subpixels SP2 in the second subpixel row ROW #2 and the structure of the third subpixels SP3 in the third subpixel row ROW #3 may be inverted with respect to each other (i.e., a flip shape).

FIG. 6 illustrates emitting areas EA1, EA2, EA3, and EA4 of the subpixels SP1, SP2, SP3, and SP4 illustrated in FIG. 5. Since the display device 100 according to the present disclosure has no decrease in the aperture ratio due to the repair structure, the emitting areas EA1, EA2, EA3, and EA4 of the subpixels SP1, SP2, SP3, and SP4 may be maximized without a decrease in the area due to the repair structure.

Figure 7:
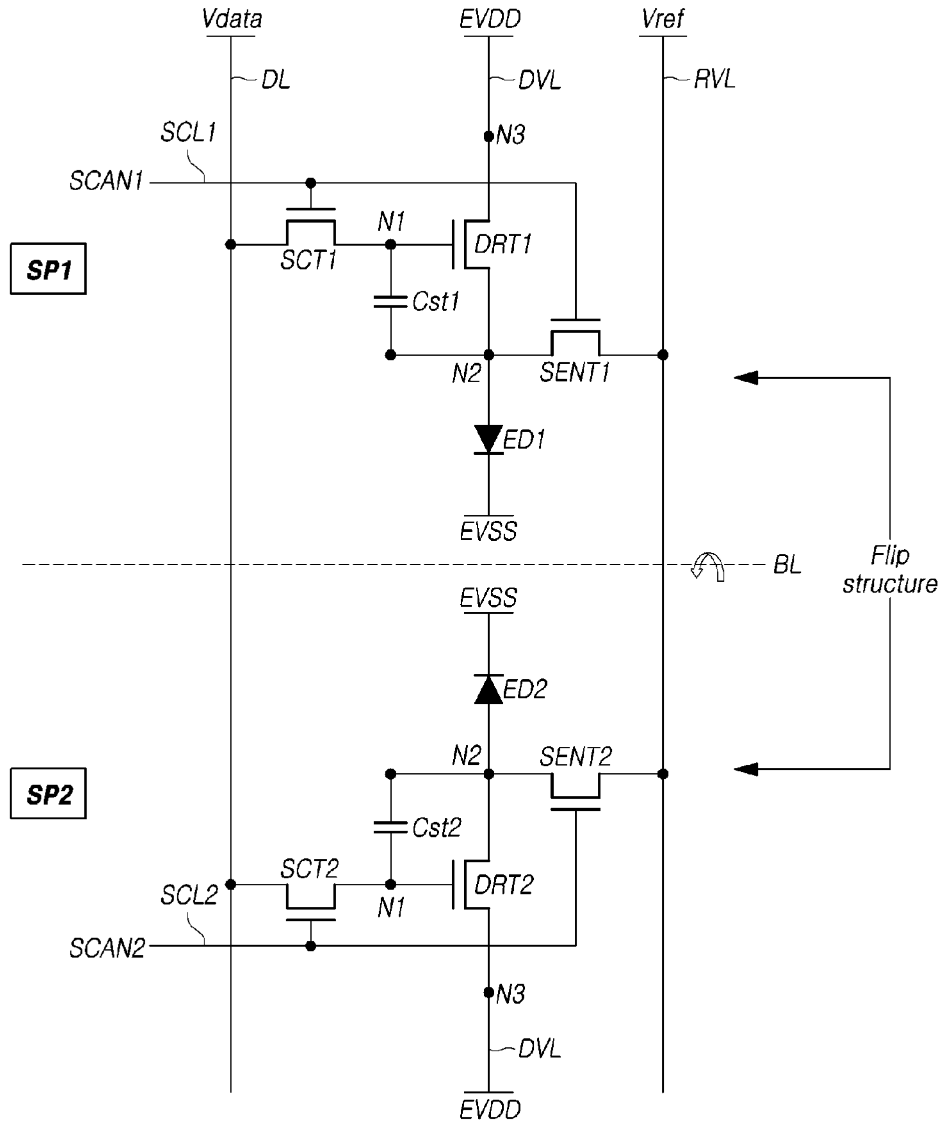
FIG. 7 illustrates an equivalent circuit of a first subpixel and a second subpixel when the first subpixel and the second subpixel have a flip structure with respect to each other in the display device according to the present disclosure.

FIG. 7 illustrates an equivalent circuit of a first subpixel SP1 and a second subpixel SP2 when the first subpixel SP1 and the second subpixel SP2 have a flip structure with respect to each other in the display device 100 according to the present disclosure.

Referring to FIG. 7, the first subpixel SP1 may include a first emitting device ED1, a first driving transistor DRT1, a first scan transistor SCT1, a first sensing transistor SENT1, and a first storage capacitor Cst1. The gate node of each of the first scan transistor SCT1 and the gate node of the first sensing transistor SENT1 may be connected in common to a single first scan line SCL1 to simultaneously receive a first scan signal SCAN1 applied therethrough. The first scan line SCL1 is a type of gate line GL.

Referring to FIG. 7, the second subpixel SP2 may include a second emitting device ED2, a second driving transistor DRT2, a second scan transistor SCT2, and a second sensing transistor SENT2, and a second storage capacitor Cst2. The gate node of the first scan transistor SCT1 and the gate node of the first sensing transistor SENT1 may be connected in common to a single second scan line SCL2 to simultaneously receive a second scan signal SCAN2 applied therethrough. The second scan line SCL2 is a type of gate line GL.

Referring to FIG. 7, the first subpixel SP1 is included in the first subpixel row ROW #1, and the second subpixel SP2 is included in the second subpixel row ROW #2. Thus, the first subpixel SP1 and the second subpixel SP2 may be connected in common to a single data line DL, and may be connected in common to a single reference voltage line RLV.

Referring to FIG. 7, since the first subpixel SP1 is included in the first subpixel row ROW #1 and the second subpixel SP2 is included in the second subpixel row ROW #2, the first subpixel SP1 and the second subpixel SP2 may be connected in common to a single driving voltage line DVL.

Referring to FIG. 7, the first subpixel SP1 and the second subpixel SP2 may be inverted (i.e., have a flip structure) with respect to each other about the boundary line BL between the first subpixel SP1 and the second subpixel SP2. That is, the structure of the second subpixel SP2 may be a flip structure of the first subpixel SP1. In other words, the first subpixel SP1 and the second subpixel SP2 may be symmetric about the boundary line BL.

Referring to FIG. 7, the structure (e.g., position and/or shape) of the devices DRT1, SCT1, SENT1, and Cst1 in the first subpixel SP1 and the structure (e.g., position and/or shape) of the devices DRT2, SCT2, SENT2, and Cst2 in the second subpixel SP2 may be inverted with respect to each other about the boundary line BL.

Referring to FIG. 7, the structure (e.g., position and/or shape) of the devices DRT1, SCT1, SENT1, and Cst1 in the first subpixel SP1 and the structure (e.g., position and/or shape) of the devices DRT2, SCT2, SENT2, and Cst2 in the second subpixel SP2 may be symmetric about the boundary line BL.

Figure 8:
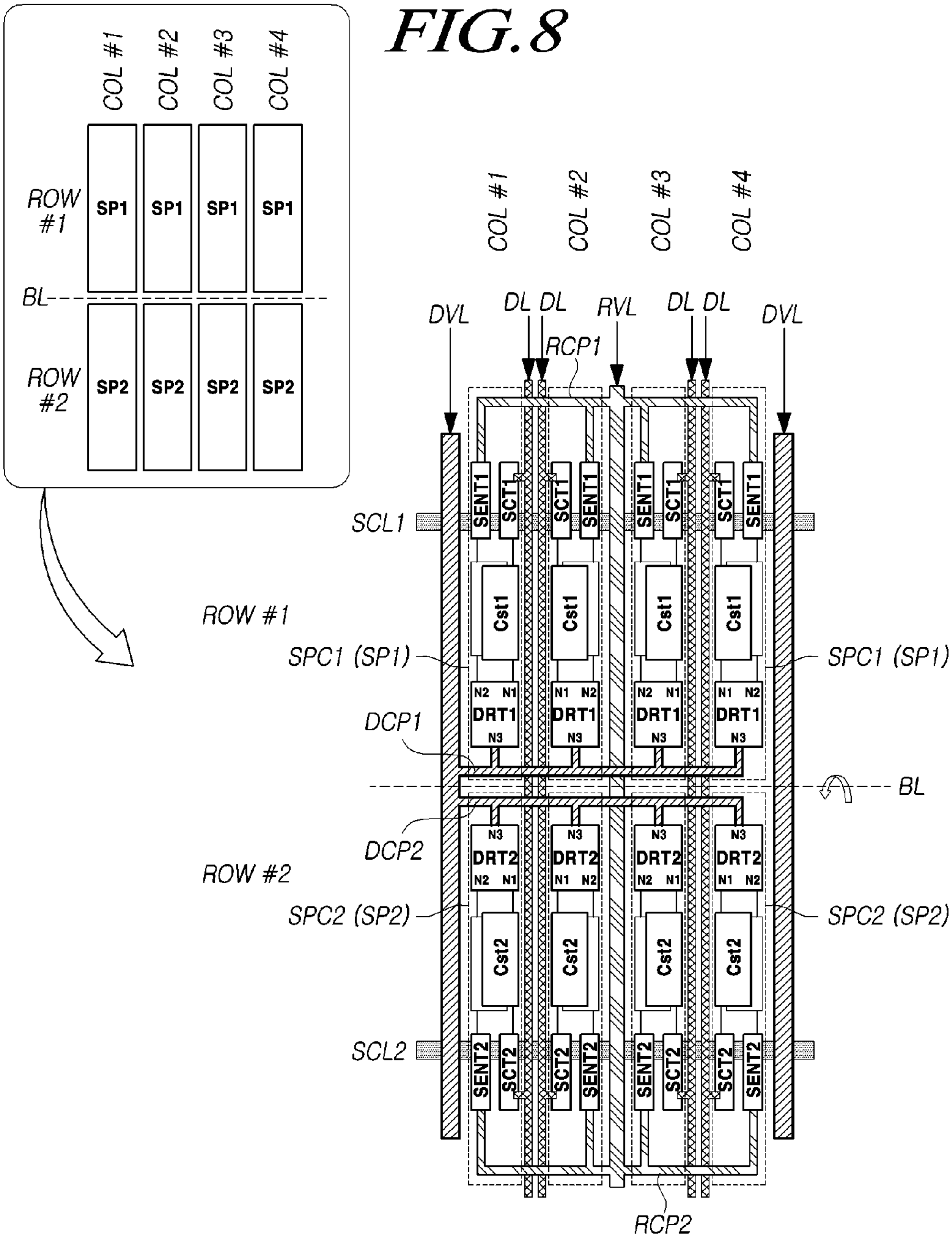
FIG. 8 illustrates a plan structure of a first subpixel row and a second subpixel row in the display device according to the present disclosure.

The flip structure of the circuit illustrated in FIG. 7 will be illustrated on a plan diagram as in FIG. 8.

FIG. 8 illustrates a plan structure of the first subpixel row ROW #1 and the second subpixel row ROW #2 in the display device 100 according to the present disclosure.

In FIG. 8, eight subpixels arranged in two rows and four columns are illustrated.

Referring to FIG. 8, four first subpixels SP1 in a first subpixel row ROW #1 include four first pixel driver circuits SPC1, and four second subpixels SP2 in a second subpixel row ROW #2 adjacent to the first subpixel row ROW #1 include four second pixel driver circuits SPC2.

The first scan line SCL1 may be disposed in the first subpixel row ROW #1, and the second scan line SCL2 may be disposed in the second subpixel row ROW #2. The first scan line SCL1 may be connected to the gate nodes of the first scan transistor SCT1 and the first sensing transistor SENT1 in each of the four first subpixels SP1.

Two data lines DL may be disposed between a first subpixel column COL #1 and a second subpixel column COL #2. One of the two data lines DL may be connected to the drain node (or the source node) of each of the scan transistors SCT1 and SCT2 of the subpixels SP1 and SP2 of the first subpixel column COL #1, and the other of the two data lines DL may be connected to the drain node (or the source node) of each of the scan transistors SCT1 and SCT2 of the subpixels SP1 and SP2 of the second subpixel column COL #2.

Two data lines DL may be disposed between a third subpixel column COL #3 and a fourth subpixel column COL

#4. One of the two data lines DL may be connected to the drain node (or the source node) of each of the scan transistors SCT1 and SCT2 of the subpixels SP1 and SP2 of the third subpixel column COL #3, and the other of the two data lines DL may be connected to the drain node (or the source node) of each of the scan transistors SCT1 and SCT2 of the subpixels SP1 and SP2 of the fourth subpixel column COL #4.

The first to fourth subpixel columns COL #1 to COL #4 may receive a reference voltage Vref through a single reference voltage line RVL. In the illustration of FIG. 8, the single reference voltage line RVL may be disposed between the second subpixel column COL #2 and the third subpixel column COL #3.

The reference voltage line RVL may be connected to the drain node (or the source node) of the first sensing transistor SENT1 in each of the four first subpixels SP1 through a first reference connection pattern RCP1 disposed in the first subpixel row ROW #1.

The reference voltage line RVL may be connected to the drain node (or the source node) of the first sensing transistor SENT1 included in each of the four second subpixels SP2 through a second reference connection pattern RCP2 disposed in the second subpixel row ROW #2.

The first to fourth subpixel columns COL #1 to COL #4 may receive a driving voltage EVDD through a single driving voltage line DVL. In the illustration of FIG. 8, the single driving voltage line DVL may be disposed on one side (to the left) of the first subpixel column COL #1.

The driving voltage line DVL may be connected to the third node N3 of a first driving transistor DRT3 in each of the four first subpixels SP1 through a first drive connection pattern DCP1 disposed in the first subpixel row ROW #1.

The driving voltage line DVL may be connected to the third node N3 of a first driving transistor DRT3 in each of the four second subpixels SP2 through a second drive connection pattern DCP2 disposed in the second subpixel row ROW #2.

Referring to FIG. 8, four first pixel driver circuits SPC1 in the first subpixel row ROW #1 and four second pixel driver circuits SPC2 in the second subpixel row ROW #2 may have a flip structure.

That is, the position and/or shape of devices DRT2, Cst2, SCT2, and SENT2 included in the second pixel driver circuit SPC2 may be configured to be inverted with respect to the position and/or shape of devices DRT1, Cst1, SCT1, and SENT1 included in the first pixel driver circuit SPC1 about the boundary line BL.

Referring to FIG. 8, signal lines SCL1, RCP1, and DCP1 disposed in a row direction in the first subpixel row ROW #1 and signal lines SCL2, RCP2, and DCP2 disposed in the row direction in the second subpixel row ROW #2 may be configured to be inverted with respect to each other. That is, the positions of the signal lines SCL1, RCP1, and DCP1 disposed in the row direction in the first subpixel row ROW #1 and the positions of the signal lines SCL2, RCP2, and DCP2 disposed in the row direction in the second subpixel row ROW #2 may be symmetric about the boundary line BL.

Figure 9:
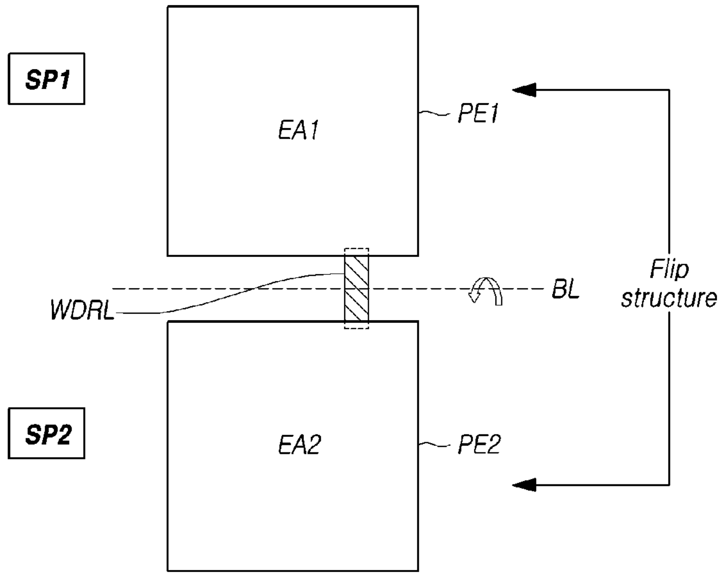
FIG. 9 is a diagram schematically illustrating a repair structure for the first subpixel and the second subpixel having a flip structure with respect to each other in the display device according to the present disclosure.

FIG. 9 is a diagram schematically illustrating a repair structure for the first subpixel SP1 and the second subpixel SP2 having a flip structure with respect to each other in the display device 100 according to the present disclosure.

Referring to FIG. 9, the first subpixel SP1 and the second subpixel SP2 may be disposed to each other and be configured to be inverted with respect to each other about the boundary line BL.

The display device 100 according to the present disclosure has a repair structure by which the bottom repair is enabled. The repair structure according to the present disclosure is for the bottom repair, and thus does not cause a decrease in the aperture ratio of each of the first subpixel SP1 and the second subpixel SP2.

The repair structure according to the present disclosure may include a welding repair line WDRL along which welding is performed in the welding repair.

The welding repair line WDRL is positioned only adjacent to the boundary line BL between the first subpixel SP1 and the second subpixel SP2. More specifically, one end of the welding repair line WDRL may overlap with at least a portion of one end of the first pixel electrode PE1 of the first subpixel SP1, and the other end of the welding repair line WDRL may overlap with at least a portion of one end of the second pixel electrode PE2 of the second subpixel SP2.

Since the welding repair line WDRL is positioned only adjacent to the boundary line BL between the first subpixel SP1 and the second subpixel SP2, a space in which the first pixel driver circuit SPC1 of the first subpixel SP1 is disposed and a space in which the second pixel driver circuit SPC2 of the second subpixel SP2 is disposed are not reduced. That is, the repair structure according to the present disclosure may not cause a decrease in the aperture ratio or an obstacle to high-resolution realization.

Hereinafter, the above-described repair structure according to the present disclosure will be described in more detail.

Figure 10:
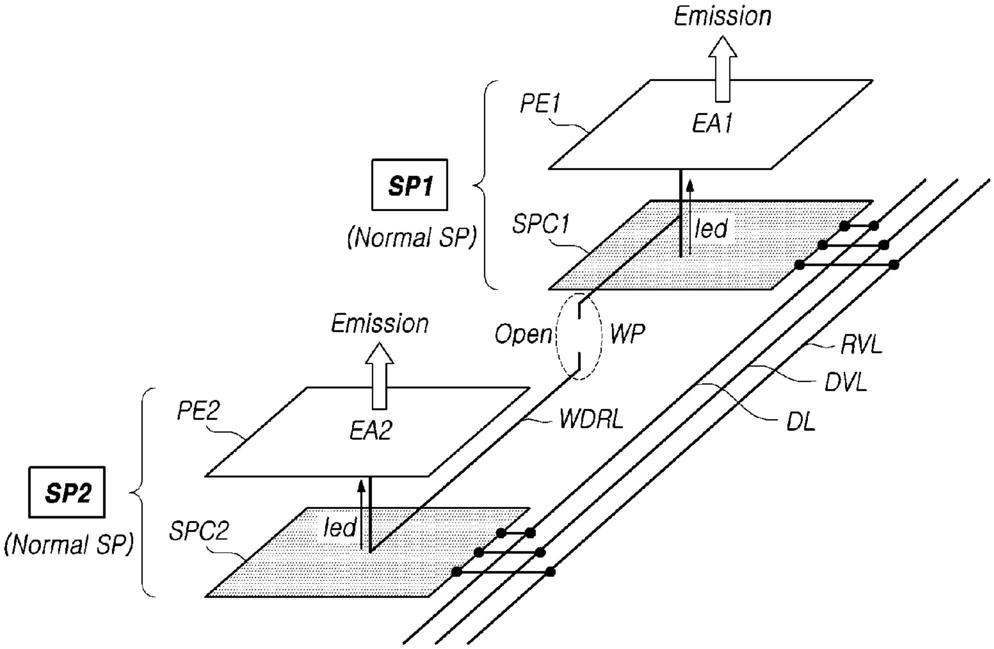
FIGS. 10 to 12 are a diagram, an equivalent circuit, and a cross-sectional diagram illustrating the state of the repair structure before the repair processing in the display device according to the present disclosure in a situation in which both the first subpixel and the second subpixel having a flip structure with respect to each other are normal subpixels.
Figure 11:
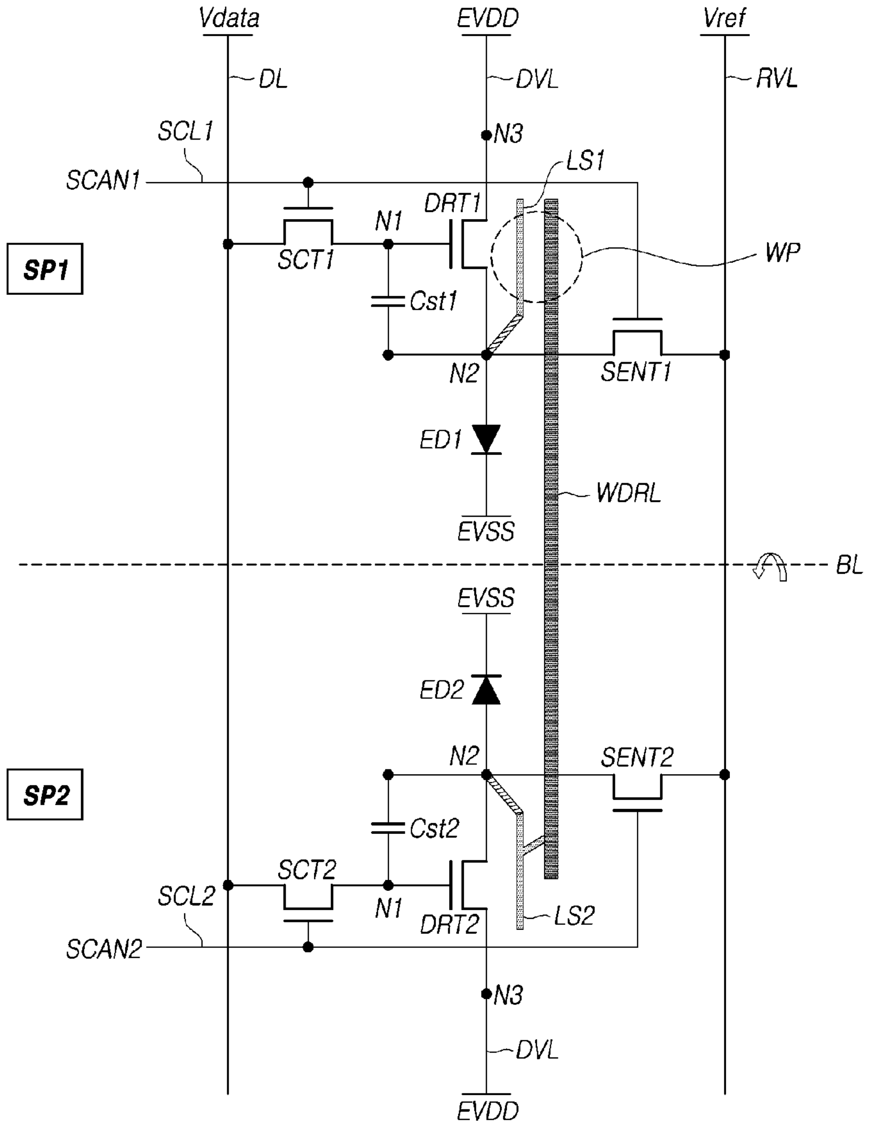
Figure 12:
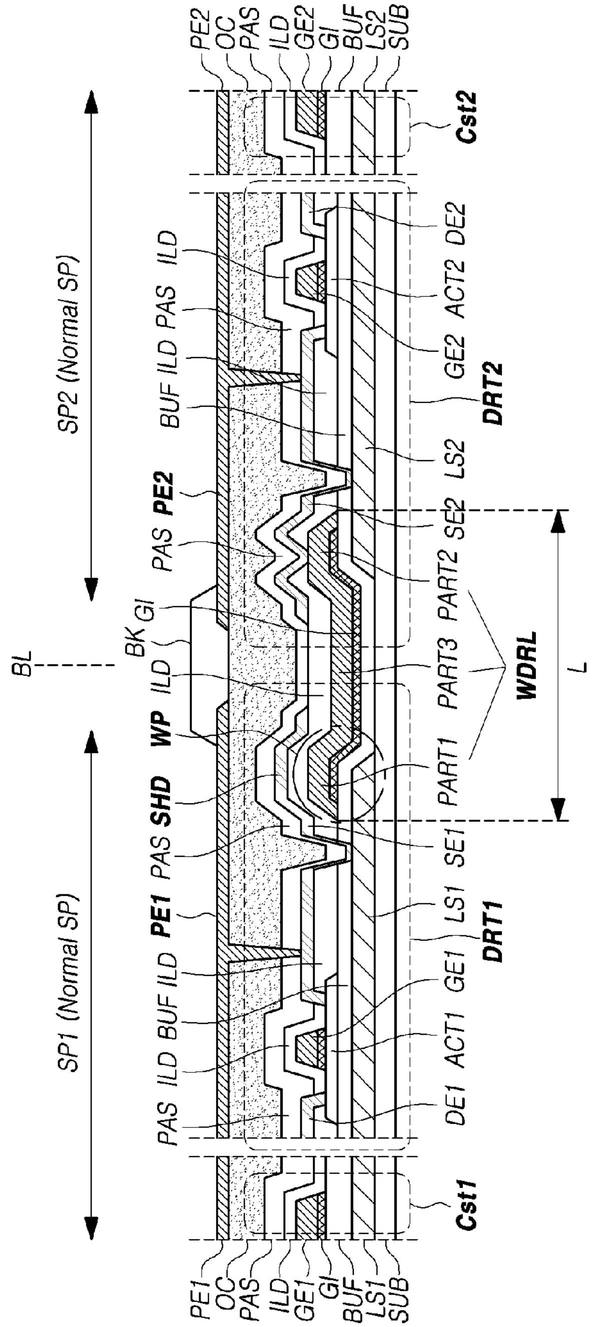

FIGS. 10 to 12 are a diagram, an equivalent circuit, and a cross-sectional diagram illustrating the state of the repair structure before the repair processing in the display device 100 according to the present disclosure in a situation in which both the first subpixel SP1 and the second subpixel SP2 having a flip structure with respect to each other are normal subpixels Normal SP.

Referring to FIGS. 10 and 11, the first subpixel SP1 may include the first emitting device ED1 and the first pixel driver circuit SPC1 for driving the first emitting device ED1. The first emitting device ED1 may include the first pixel electrode PE1, and the first pixel driver circuit SPC1 may be connected to the data line DL, the driving voltage line DVL, and the reference voltage line RVL.

Referring to FIGS. 10 and 11, the second subpixel SP2 may include the second emitting device ED2 and the second pixel driver circuit SPC2 for driving the second emitting device ED2. The second emitting device ED2 may include the second pixel electrode PE2, and the second pixel driver circuit SPC2 may be connected to the data line DL, the driving voltage line DVL, and the reference voltage line RVL.

Referring to FIG. 10, since both the first subpixel SP1 and the second subpixel SP2 are normal subpixels Normal SP, the welding repair line WDRL may be connected to only one of the first pixel driver circuit SPC1 and the second pixel driver circuit SPC2. For example, the welding repair line WDRL may be electrically connected to only the second pixel driver circuit SPC2 of the first pixel driver circuit SPC1 and the second pixel driver circuit SPC2.

Referring to FIG. 10, when both the first subpixel SP1 and the second subpixel SP2 are normal subpixels Normal SP, the first emitting device ED1 may be supplied with driving current led from the first driving transistor DRT1 of the first pixel driver circuit SPC1, and the second emitting device ED2 may be supplied with driving current led from the second driving transistor DRT2 of the second pixel driver circuit SPC2.

Referring to FIG. 11, the first subpixel SP1 may include the first emitting device ED1 and the first pixel driver circuit SPC1, and the first pixel driver circuit SPC1 may include the first driving transistor DRT1, the first scan transistor SCT1, and the first storage capacitor Cst1.

Referring to FIG. 11, the second subpixel SP2 may include the second emitting device ED2 and the second pixel driver circuit SPC2, and the second pixel driver circuit SPC2 may include the second driving transistor DRT2, the second scan transistor SCT2, and the second storage capacitor Cst2.

Referring to FIGS. 11 and 12, the second subpixel SP2 may be disposed adjacent to the first subpixel SP1 and be configured to be inverted with respect to the first subpixel SP1.

Referring to FIGS. 11 and 12, the first driving transistor DRT1 and the second driving transistor DRT2 may be positioned adjacent to each other such that the first subpixel SP1 and the second subpixel SP2 are configured to be inverted with respect to each other and form a repair structure.

Thus, the first driving transistor DRT1 and the second driving transistor DRT2 may be positioned between the first scan transistor SCT1 and the second scan transistor SCT2 (see FIG. 8). The first scan transistor SCT1 and the second scan transistor SCT2 may be connected to the same data line DL.

Referring to FIG. 12, a first shield metal LS1 and a second shield metal SL2 may be disposed on or over the substrate SUB.

The first shield metal LS1 may be positioned below the first driving transistor DRT1. The second shield metal LS2 may be positioned below the second driving transistor DRT2.

A buffer layer BUF may be disposed on or over the first shield metal LS1 and the second shield metal LS2. A first active layer ACT1 included in the first driving transistor DRT1 may be disposed on or over the buffer layer BUF, and a second active layer ACT2 included in second driving transistor DRT2 may be disposed on or over the buffer layer BUF.

A gate insulating film GI may be disposed on each of the first active layer ACT1 and the second active layer ACT2. A first gate electrode GE1 may be disposed above the gate insulating film GI on the first active layer ACT1, and a second gate electrode GE2 may be disposed above the gate insulating film GI on the second active layer ACT2. Afterwards, an interlayer insulating film ILD may be disposed above the first gate electrode GE1, the second gate electrode GE2, and the buffer layer BUF.

A first source electrode SE1 and a first drain electrode DE1 included in the first driving transistor DRT1 may be positioned on or over the interlayer insulating film ILD. In addition, the first active layer ACT1 may include a channel area, a first conductorized portion positioned on one side of the channel area, and a second conductorized portion positioned on the other side of the channel area.

The first source electrode SE1 of the first driving transistor DRT1 may be connected to the first conductorized portion of the first active layer ACT1 through a contact hole of the interlayer insulating film ILD, and the first drain electrode DE1 of the first driving transistor DRT1 may be connected to the second conductorized portion of the first active layer ACT1 through another contact hole of the interlayer insulating film ILD.

The second source electrode SE2 and the second drain electrode DE2 included in the second driving transistor DRT2 may be positioned on or over the interlayer insulating film ILD. Meanwhile, the second active layer ACT2 may include a channel area, a first conductorized portion positioned on one side of the channel area, and a second conductorized portion positioned on the other side of the channel area.

The second source electrode SE2 of the second driving transistor DRT2 may be connected to the first conductorized portion of the second active layer ACT2 through another contact hole of the interlayer insulating film ILD, and the second drain electrode DE2 of the second driving transistor DRT2 may be connected to the second conductorized portion of the second active layer ACT2 through another contact hole of the interlayer insulating film ILD.

The passivation film PAS may be disposed on or over the first source electrode SE1 and the first drain electrode DE1 of the first driving transistor DRT1 and the second source electrode SE2 and the second drain electrode DE2 of the second driving transistor DRT2.

The overcoat layer OC may be disposed on or over the passivation film PAS. The first pixel electrode PE1 and the second pixel electrode PE2 may be disposed on or over the overcoat layer OC.

A bank BK may be disposed adjacent to the boundary line BL between the first subpixel SP1 and the second subpixel SP2. One side of the bank BK may cover one end of the first pixel electrode PE1, and the other side of the bank BK may cover the other end of the second pixel electrode PE2.

The first pixel electrode PE1 may be connected to the first source electrode SE1 through holes in the overcoat layer OC and the passivation film PAS. The second pixel electrode PE2 may be connected to the second source electrode SE2 through other holes in the overcoat layer OC and the passivation film PAS.

The first storage capacitor Cst1 may be configured by an overlap with in whole or in part between the first shield metal LS1 and the first gate electrode GE1 of the first driving transistor DRT1.

The second storage capacitor Cst2 may be configured by an overlap with in whole or in part between the second shield metal LS2 and the second gate electrode GE2 of the second driving transistor DRT2.

Referring to FIG. 12, the first source electrode SE1 of the first driving transistor DRT1 may be electrically connected to the first shield metal LS1 through first holes in the interlayer insulating film ILD and the buffer layer BUF. Here, the first source electrode SE1 of the first driving transistor DRT1 may be an electrode corresponding to the second node N2 of the first driving transistor DRT1.

The second source electrode SE2 included in the second driving transistor DRT2 may be positioned on or over the interlayer insulating film ILD. The second source electrode SE2 included in the second driving transistor DRT2 may be electrically connected to the second shield metal LS2 through second holes in the interlayer insulating film ILD and the buffer layer BUF. Here, the second source electrode SE2 of the second driving transistor DRT2 may be an electrode corresponding to the second node N2 of the second driving transistor DRT2.

Referring to FIG. 12, the welding repair line WDRL may be positioned between the buffer layer BUF and the interlayer insulating film ILD. The welding repair line WDRL may include a first portion PART1 overlapping with at least a part of the first shield metal LS1, a second portion PART2 electrically connected to the second source electrode SE2 through a hole in the interlayer insulating film ILD, and a third portion PART3 provided between the first portion PART1 and the second portion PART2.

The welding repair line WDRL may be positioned in a boundary line portion including the boundary line BL between the first subpixel SP1 and the second subp welding repair line ixel SP2.

Since the welding repair line WDRL is disposed between a position below the first source electrode SE1 of the first driving transistor DRT1 and a position below the second source electrode SE2 of the second driving transistor source electrode DRT2, the length L of the welding repair line WDRL may be significantly short.

According to these features, neither the space in which the first pixel driver circuit SPC1 is disposed nor the space in which the second pixel driver circuit SPC2 is disposed is substantially reduced by the welding repair line WDRL. Accordingly, even in the case that the display device 100 according to the present disclosure has the repair structure, the high-resolution realization of the display device 100 can be further facilitated.

Referring to FIG. 12, in terms of the first subpixel SP1, the display panel 110 may include the substrate SUB; the first shield metal LS1 on or over the substrate SUB; the buffer layer BUF on or over the first shield metal LS1; the interlayer insulating film ILD over the buffer layer BUF; the first source electrode SE1 included in the first driving transistor DRT1, positioned on or over the interlayer insulating film ILD, and electrically connected to the first shield metal LS1 through the first holes in the interlayer insulating film ILD and the buffer layer BUF; the insulating films PAS and OC on or over the first source electrode SE1; and the first pixel electrode PE1 positioned on or over the insulating films PAS and OC and electrically connected to the first source electrode SE1 through the holes in the insulating films PAS and OC.

Referring to FIG. 12, in terms of the second subpixel SP2, the display panel 110 may include the substrate SUB; the second shield metal LS2 on or over the substrate SUB; the buffer layer BUF on or over the second shield metal LS2; the interlayer insulating film ILD over the buffer layer BUF; the second source electrode SE2 included in the second driving transistor DRT2, positioned on or over the interlayer insulating film ILD, and electrically connected to the second shield metal LS2 through the second holes in the interlayer insulating film ILD and the buffer layer BUF; the insulating films PAS and OC on or over the second source electrode SE2; and the second pixel electrode PE2 positioned on or over the insulating films PAS and OC and electrically connected to the second source electrode SE2.

Referring to FIG. 12, the welding repair line WDRL may be positioned between the buffer layer BUF and the interlayer insulating film ILD.

The welding repair line WDRL may have the portion PART1 interposed between the first shield metal LS1 and the first source electrode SEL. The portion PART1 of the welding repair line WDRL interposed between the first shield metal LS1 and the first source electrode SE1 is the above-described first portion PART1 of the welding repair line WDRL. The portion PART1 of the welding repair line WDRL interposed between the first shield metal LS1 and the first source electrode SE1 may overlap with at least a part of the first pixel electrode PE1.

As illustrated in FIG. 12, when both the first subpixel SP1 and the second subpixel SP2 are normal subpixels Normal SP, the first portion PART1 of the welding repair line WDRL may be spaced apart from the first source electrode SEL.

The welding repair line WDRL may have the second portion PART2 interposed between the second shield metal LS2 and the second source electrode SE2. The second portion PART2 of the welding repair line WDRL interposed between the second shield metal LS2 and the second source electrode SE2 is the above-described second portion PART2 of the welding repair line WDRL.

Referring to FIG. 12, irrespective of the state (e.g., normal or abnormal state) of the first subpixel SP1 and the second subpixel SP2, the second portion PART2 of the welding repair line WDRL may be electrically connected to the second source electrode SE2.

Referring to FIG. 12, a portion of the bank BK may overlap with at least a part of the welding repair line WDRL.

As illustrated in FIG. 12, when both the first subpixel SP1 and the second subpixel SP2 are normal subpixels Normal SP, the first shield metal LS1 may be electrically disconnected from the welding repair line WDRL.

Referring to FIG. 12, the first source electrode SE1 of the first driving transistor DRT1 may include a shield portion SHD overlapping with at least a part of the first portion PART1 of the welding repair line WDRL. The first pixel electrode PE1 included in the first emitting device ED1 may be disposed over the shield portion SHD of the first source electrode SEL. The shield portion SHD of the first source electrode SE1 may be positioned between the first pixel electrode PE1 and the first portion PART1 of the welding repair line WDRL, and the shield portion SHD of the first source electrode SE1 may overlap with at least a portion of the first pixel electrode PE1.

In the welding repair for the welding point WP, the shield portion SHD of the first source electrode SE1 may prevent the first pixel electrode PE1 positioned above the welding point WP from being damaged by the welding processing.

Referring to FIG. 12, the welding repair line WDRL may contain a material the same as the first shield metal LS1 or the second shield metal LS2.

For example, the welding repair line WDRL may contain a first metal (e.g., a gate metal) the same as the gate electrode GE1 or GE2 of each of the first driving transistor DRT1 and the second driving transistor DRT2. Each of the first source electrode SE1 and the second source electrode SE2 may contain a second metal (e.g., a source-drain metal) different from the first metal (e.g., the gate metal). Each of the first shield metal LS1 and the second shield metal LS2 may contain the first metal (e.g., the gate metal).

For example, each of the welding repair line WDRL, the first shield metal LS1, and the second shield metal LS2 may contain at least one of Cu and MoTi.

For example, each of the first and second shield metals LS1 and LS2 or each of the first and second source electrodes SE1 and SE2 may contain at least one of Cu and MoTi. Each of the first pixel electrode PE1 and the second pixel electrode PE2 may be formed of indium tin oxide (ITO), ITO/Ag/ITO, or ITO/MoTi/Ag/MoTi/ITO.

For example, the welding repair line WDRL may be formed of the gate metal, whereas each of the first shield metal LS1 and the second shield metal LS2 may contain Cu/MoTi.

Each of the first pixel electrode PE1 of the first emitting device ED1 and the second pixel electrode PE2 of the second emitting device ED2 may have a first specific resistance. Each of the welding repair line WDRL, the first shield metal LS1, and the second shield metal LS2 may have a second specific resistance lower than the first specific resistance.

For example, when each of the first pixel electrode PE1 of the first emitting device ED1 and the second pixel electrode PE2 of the second emitting device ED2 contains ITO, the specific resistance of ITO may vary depending on the thickness but be on the order of about $10^{-4}$ Ω·cm. The specific resistance of Cu is $1.68\times10^{-8}$ Ω·cm, which is several thousand times lower than the specific resistance of ITO. Thus, as described above, when the welding repair line WDRL contains Cu/MoTi as the same material as the first shield metal LS1 and the second shield metal LS2, a resistance-applied voltage between the second nodes N2 of the driving transistors DRT1 and DRT2 and the pixel electrodes PE1 and PE2 can be reduced, thereby increasing a voltage applied to the emitting devices ED1 and ED2. Consequently, a voltage range between the node to which the driving voltage EVDD is applied and the node to which the base voltage EVSS is applied can be reduced, thereby reducing the consumption of power.

Figure 13:
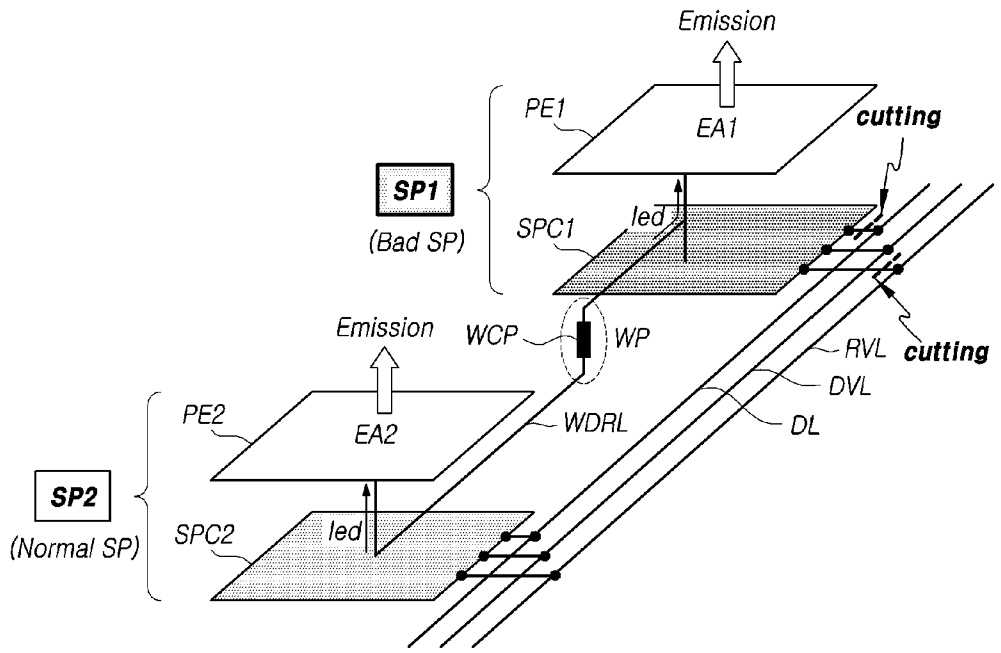
FIGS. 13 to 15 are a diagram, an equivalent circuit, and a cross-sectional diagram illustrating the state of the repair structure after the repair processing in the display device according to the present disclosure in a situation in which the first subpixel SP1 among the first subpixel and the second subpixel having a flip structure with respect to each other is a bad subpixel.
Figure 14:
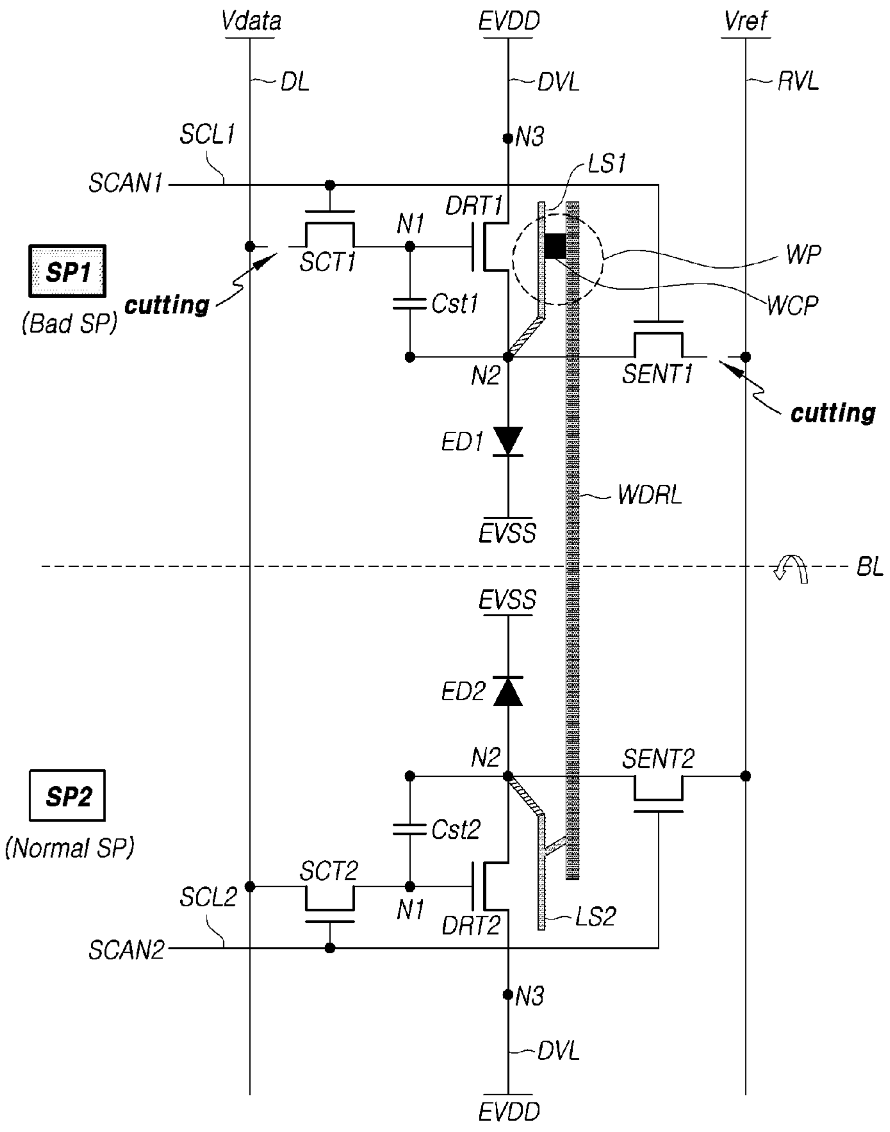
Figure 15:
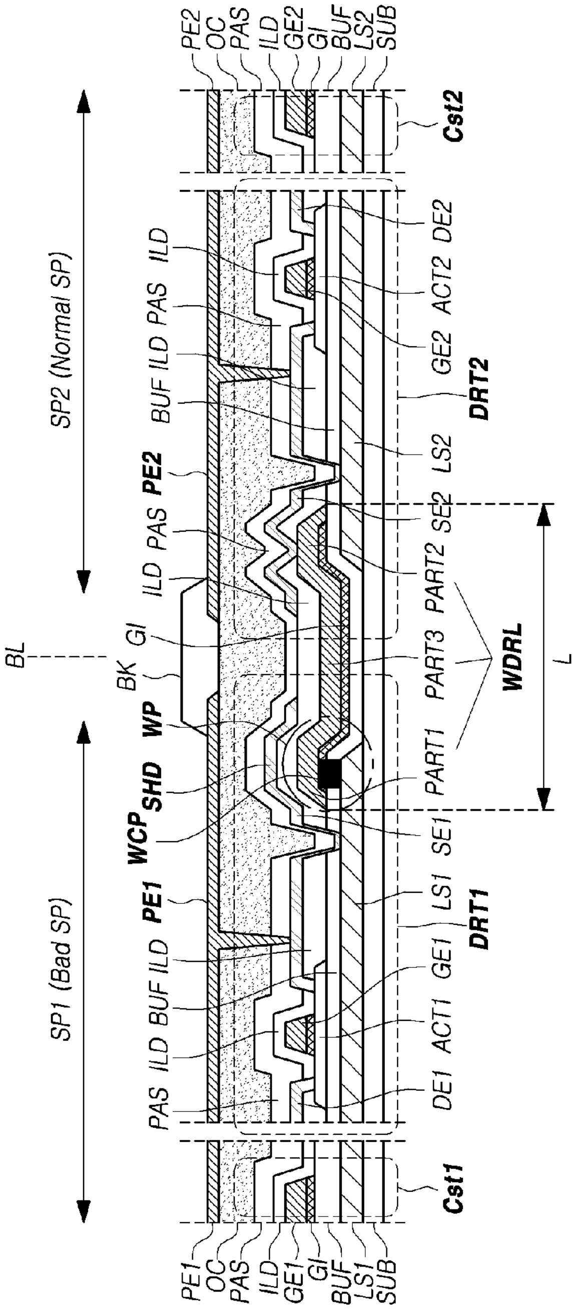

FIGS. 13 to 15 are a diagram, an equivalent circuit, and a cross-sectional diagram illustrating the state of the repair structure after the repair processing in the display device 100 according to the present disclosure in a situation in which the first subpixel SP1 among the first subpixel SP1 and the second subpixel SP2 having a flip structure with respect to each other is a bad subpixel Bad SP.

FIGS. 10 to 12 are the diagram, the equivalent circuit, and the cross-sectional diagram illustrating the state of the repair structure when the repair processing is not performed since both the first subpixel SP1 and the second subpixel SP2 configured to be inverted with respect to each other are normal subpixels Normal SP. In contrast, FIGS. 13 to 15 the diagram, the equivalent circuit, and the cross-sectional diagram illustrating the changed state of the repair structure after the repair processing is performed in a situation in which the first subpixel SP1 among the first subpixel SP1 and the second subpixel SP2 configured to be inverted with respect to each other is a bad subpixel Bad SP.

Thus, hereinafter, the changed state of the repair structure due to the repair processing will mainly be described.

Referring to FIGS. 13 and 14, when the first subpixel SP1 among the first subpixel SP1 and the second subpixel SP2 is a bad subpixel Bad SP, the first emitting device ED1 may be supplied with driving current from the second driving transistor DRT2.

Referring to FIGS. 14 and 15, when the first subpixel SP1 among the first subpixel SP1 and the second subpixel SP2 is a bad subpixel Bad SP, the welding repair line WDRL may be electrically connected to the first shield metal LS1.

Referring to FIGS. 13 and 14, when the first subpixel SP1 among the first subpixel SP1 and the second subpixel SP2 is a bad subpixel Bad SP, the drain node or the source node of the first scan transistor SCT1 may be electrically disconnected from the data line DL electrically connected to the drain node or the source node of the second scan transistor SCT2.

Referring to FIGS. 13 and 14, when the first subpixel SP1 among the first subpixel SP1 and the second subpixel SP2 is a bad subpixel Bad SP, the drain node or the source node of the first sensing transistor SENT1 may be electrically disconnected from the reference voltage line RVL electrically connected to the drain node or the source node of the second sensing transistor SENT2.

Referring to FIG. 15, due to the welding repair, the first portion PART1 of the welding repair line WDRL interposed between the first shield metal LS1 and the first source electrode SE1 may be electrically connected to the first shield metal LS1. Due to the welding repair, a welding connection pattern WCP may be formed between the first portion PART1 of the welding repair line WDRL and the first shield metal LS1.

Referring to FIG. 15, the display panel 110 may further include the welding connection pattern WCP connecting the first portion PART1 of the welding repair line WDRL interposed between the first shield metal LS1 and the first source electrode SE1 to the first shield metal LS1.

Referring to FIG. 15, the first source electrode SE1 may include the shield portion SHD extending to overlap with at least a part of the welding connection pattern WCP. That is, the extending shield portion SHD of the first source electrode SE1 may overlap with at least a part of the first portion PART1 of the welding repair line WDRL.

Referring to FIG. 15, the first pixel electrode PE1 included in the first emitting device ED1 may be disposed over the shield portion SHD of the first source electrode SEL. The shield portion SHD of the first source electrode SE1 may be positioned between the first pixel electrode PE1 and the first portion PART1 of the welding repair line WDRL. The shield portion SHD of the first source electrode SE1 may overlap with at least a portion of the first pixel electrode PE1.

Referring to FIG. 15, in the welding repair for the welding point WP, the shield portion SHD of the first source electrode SE1 can prevent the first pixel electrode PE1 positioned above the welding point WP from being damaged by the welding processing.

Figure 16:
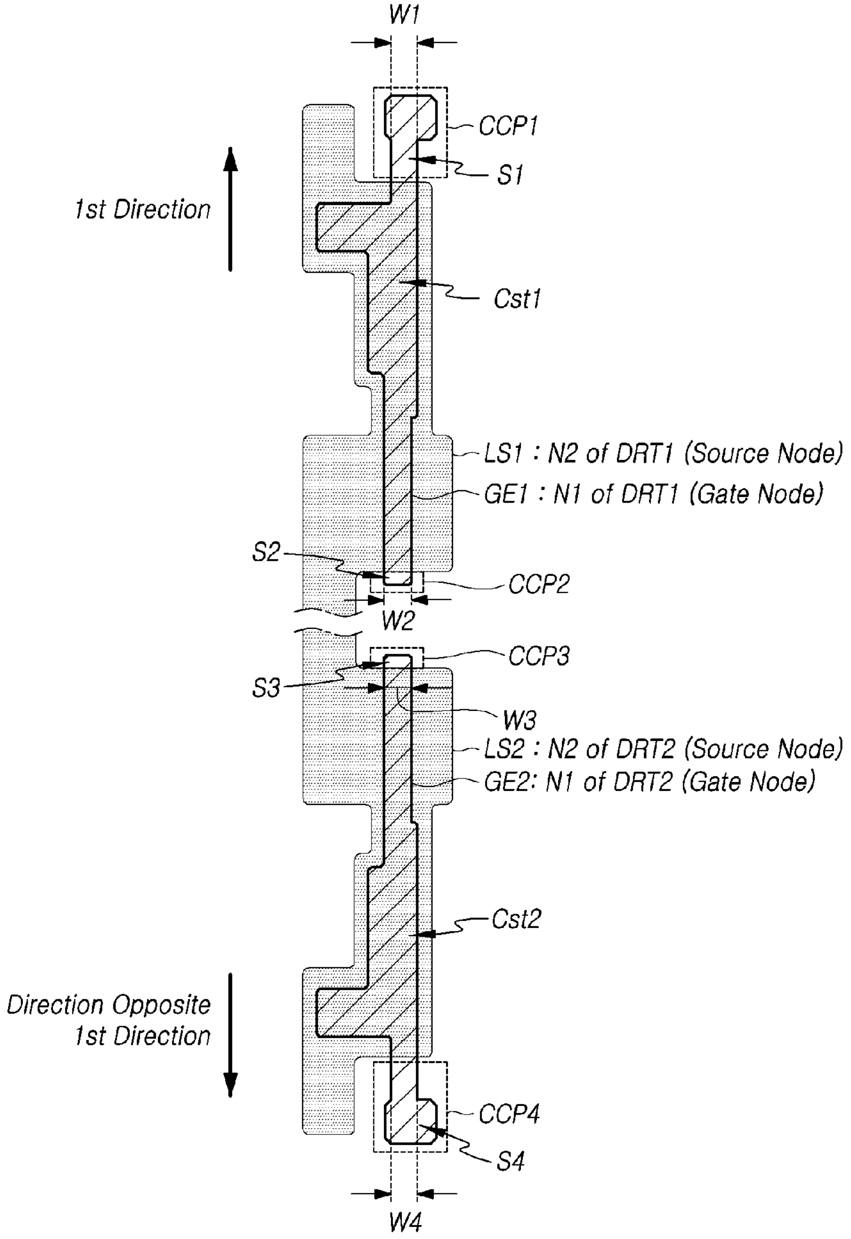
FIG. 16 illustrates the first storage capacitor and the second storage capacitor having a compensation pattern for reducing a deviation in storage capacitance in the display device according to the present disclosure.
Figure 17:
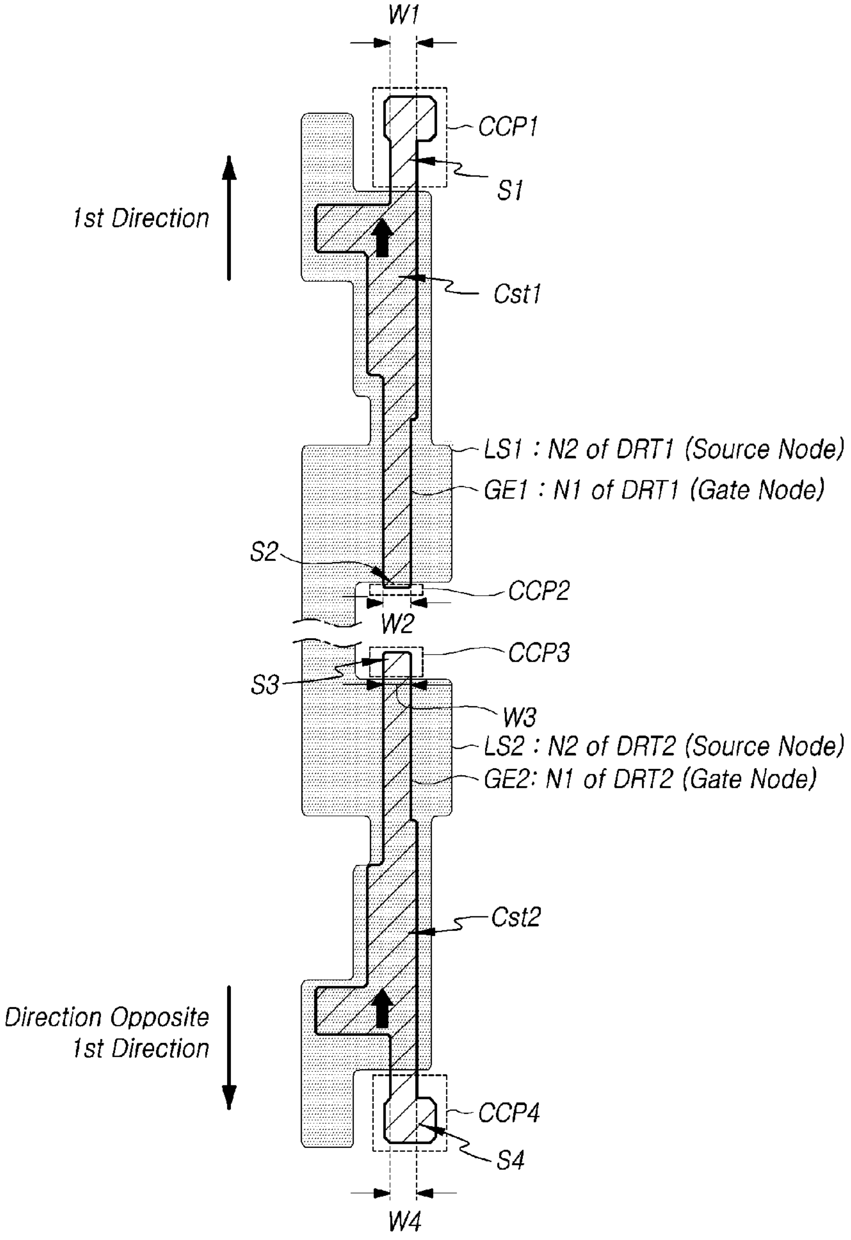
FIGS. 17 and 18 illustrate the first storage capacitor Cst1 and the second storage capacitor in a situation in which the first gate electrode and the second gate electrode are shifted in the first direction depending on the process deviation in a fabrication process of the display device according to the present disclosure.
Figure 18:
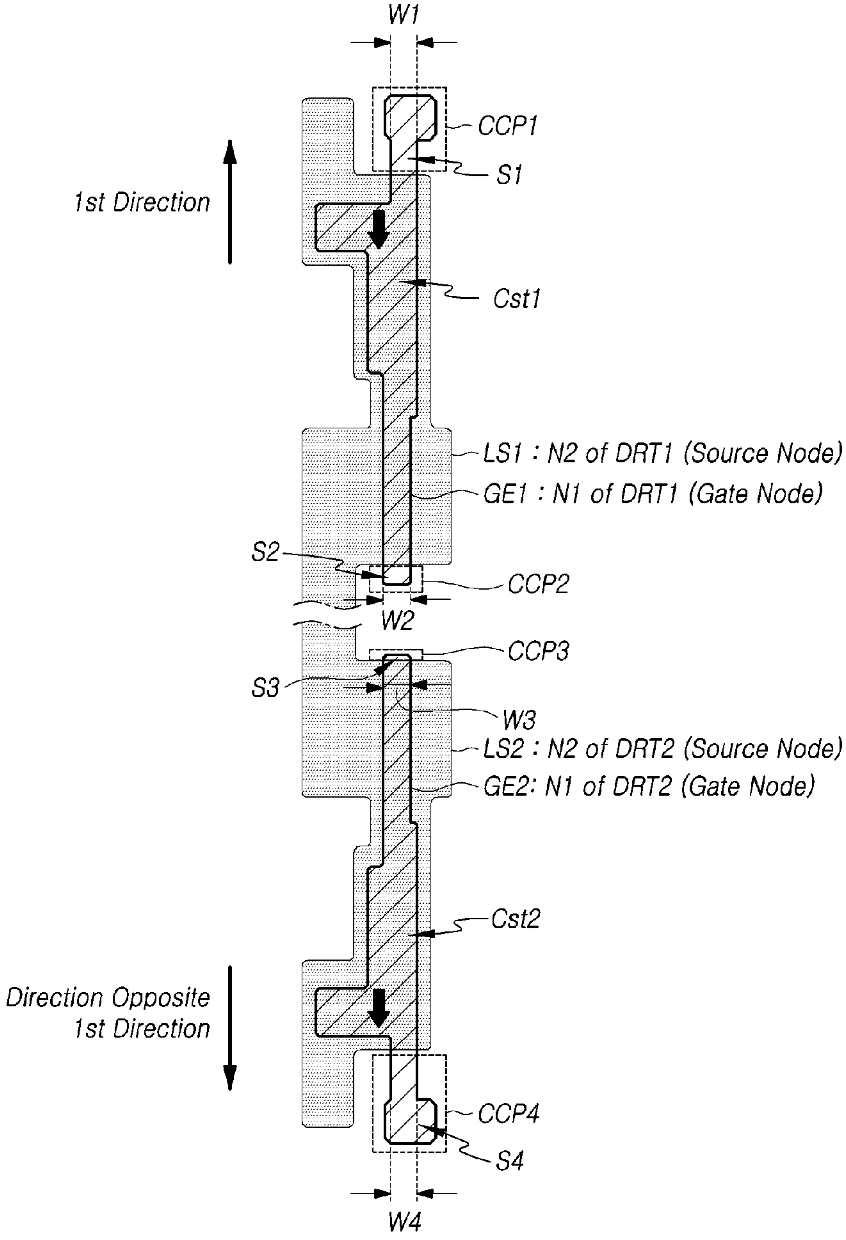

FIG. 16 illustrates the first storage capacitor Cst1 and the second storage capacitor Cst2 having a compensation pattern for reducing a deviation in storage capacitance in the display device 100 according to the present disclosure, and FIGS. 17 and 18 illustrate the first storage capacitor Cst1 and the second storage capacitor Cst2 in a situation in which the first gate electrode GE1 and the second gate electrode GE2 are shifted in the first direction depending on the process deviation in a fabrication process of the display device 100 according to the present disclosure.

Referring to FIG. 16, the first storage capacitor Cst1 of the first subpixel SP1 may be configured by an overlap with in whole or in part between the first shield metal LS1 and the first gate electrode GE1 of the first driving transistor DRT1. The second storage capacitor Cst2 of the second subpixel SP2 may be configured by an overlap with in whole or in part between the second shield metal LS2 and the second gate electrode GE2 of the second driving transistor DRT2.

Referring to FIG. 16, in a situation in which a process deviation occurs in the fabrication process of the display panel, when the first subpixel SP1 and the second subpixel SP2 have a flip structure, the capacitance deviation between the first storage capacitor Cst1 and the second storage capacitor Cst2 may be increased.

Thus, aspects may have a capacitance deviation reducing structure. The capacitance deviation reducing structure according to the present disclosure can remove or prevent a capacitance deviation between the first storage capacitor Cst1 and the second storage capacitor Cst2 when the capacitance deviation occurs in the fabrication process of the display device even in the case that the first subpixel SP1 and the second subpixel SP2 have a flip structure.

The capacitance deviation reducing structure according to the present disclosure may include first and second compensation patterns CCP1 and CCP2 in which the first gate electrode GE1, i.e., one of two plates GE1 and LS1 of the first storage capacitor Cst1, extends.

The capacitance deviation reducing structure according to the present disclosure may include third and fourth compensation patterns CCP3 and CCP4 in which the second gate electrode GE2, i.e., one of two plates GE2 and LS2 of the second storage capacitor Cst2, extends.

Referring to FIG. 16, the first gate electrode GE1 may include the first compensation pattern CCP1 extending in the first direction so as to not overlap with the first shield metal LS1 and the second compensation pattern CCP2 extending in the direction opposite the first direction so as to not overlap with the first shield metal LS1.

Referring to FIG. 16, the second gate electrode GE2 may include the third compensation pattern CCP3 extending in the first direction so as to not overlap with the second shield metal LS2 and the fourth compensation pattern CCP4 extending in the direction opposite the first direction so as to not overlap with the second shield metal LS2.

Referring to FIG. 16, the width W1 of the first compensation pattern CCP1 may be the same as the width W2 of the second compensation pattern CCP2. The width W3 of the third compensation pattern CCP3 may be the same as the width W4 of the fourth compensation pattern CCP4.

Referring to FIG. 16, the first storage capacitor Cst1 and the second storage capacitor Cst2 may be configured to be symmetric about the boundary line BL between the first subpixel SP1 and the second subpixel SP2.

Referring to FIG. 16, the area size S1 of the first compensation pattern CCP1 and the area size S4 of the fourth compensation pattern CCP4 may be the same. The area size S2 of the second compensation pattern CCP2 and the area size S3 of the third compensation pattern CCP3 may be the same.

When there is no process deviation, i.e., when the first shield metal LS1 and the second shield metal LS2 are patterned at accurate positions and the first gate electrode GE1 and the second gate electrode GE2 are also patterned at accurate positions, the overlapping area of the first shield metal LS1 and the first gate electrode GE1 of the first driving transistor DRT1 may have an intended value, and the overlapping area of the second shield metal LS2 and the second gate electrode GE2 of the second driving transistor DRT2 may have an intended value. The overlapping area of the first shield metal LS1 and the first gate electrode GE1 of the first driving transistor DRT1 and the overlapping area of the second shield metal LS2 and the second gate electrode GE2 of the second driving transistor DRT2 may be the same. Accordingly, the first storage capacitor Cst1 and the second storage capacitor Cst2 can have the same capacitance.

When the first gate electrode GE1 and the second gate electrode GE2 are formed by patterning shifted in the first direction or the direction opposite the first direction due to a process deviation that has occurred during the fabrication process of the display device, the capacitance of one of the first storage capacitor Cst1 and the second storage capacitor Cst2 may be increased and the capacitance of the other of the first storage capacitor Cst1 and the second storage capacitor Cst2 may be reduced, due to the flip structure of the first subpixel SP1 and the second subpixel SP2.

Referring to FIG. 17, when the first gate electrode GE1 and the second gate electrode GE2 are formed by patterning shifted in the first direction due to the process deviation in the fabrication process of the display device 100 according to the present disclosure, due to the first compensation pattern CCP1 and the second compensation pattern CCP2, the overlapping area of the first shield metal LS1 and the first gate electrode GE1 of the first driving transistor DRT1 is not changed from the overlapping area in a normal situation (FIG. 16).

Referring to FIG. 17, when the first gate electrode GE1 and the second gate electrode GE2 are formed by patterning shifted in the first direction due to the process deviation in the fabrication process of the display device 100 according to the present disclosure, the area size S1 of the first compensation pattern CCP1 may be greater than the area size S4 of the fourth compensation pattern CCP4. The area size S2 of the second compensation pattern CCP2 may be smaller than the area size S3 of the third compensation pattern CCP3.

Consequently, the overlapping area of the first shield metal LS1 and the first gate electrode GE1 of the first driving transistor DRT1 may remain the same, instead of being changed to be greater or smaller than the overlapping area in the normal situation (FIG. 16). Accordingly, the first storage capacitor Cst1 and the second storage capacitor Cst2 can have the same capacitance.

Referring to FIG. 18, when the first gate electrode GE1 and the second gate electrode GE2 are formed by patterning shifted in the direction opposite the first direction due to the process deviation in the fabrication process of the display device 100 according to the present disclosure, due to the first compensation pattern CCP1 and the second compensation pattern CCP2, the overlapping area of the first shield metal LS1 and the first gate electrode GE1 of the first driving transistor DRT1 is not changed from the overlapping area in the normal situation (FIG. 16).

Referring to FIG. 18, when the first gate electrode GE1 and the second gate electrode GE2 are formed by patterning shifted in the direction opposite the first direction due to the process deviation in the fabrication process of the display device 100 according to the present disclosure, the area size S1 of the first compensation pattern CCP1 may be smaller than the area size S4 of the fourth compensation pattern CCP4. The area size S2 of the second compensation pattern CCP2 may be greater than the area size S3 of the third compensation pattern CCP3.

Consequently, the overlapping area of the first shield metal LS1 and the first gate electrode GE1 of the first driving transistor DRT1 may remain the same, instead of being changed to be greater or smaller than the overlapping area in the normal situation (FIG. 16). Accordingly, the first storage capacitor Cst1 and the second storage capacitor Cst2 can have the same capacitance.

According to the present disclosure of the present disclosure as set forth above, the display device may include the repair structure that does not cause a decrease in the aperture ratio.

According to the present disclosure, the display device may include the repair structure that does not occupy a large space and the subpixel structure for the repair structure.

According to the present disclosure, the display device may include the repair structure suitable for high-resolution realization.

According to the present disclosure, the display device may include the shield structure that can prevent the pixel electrode positioned above the welding repair line from being damaged by welding processing when the welding repair line is welded.

The above description has been presented to enable any person skilled in the art to make and use the technical idea of the present disclosure, and has been provided in the context of a particular application and its requirements. Various modifications, additions and substitutions to the described aspects will be readily apparent to those skilled in the art, and the general principles defined herein may be applied to other aspects and applications without departing from the spirit and scope of the present disclosure. The above description and the accompanying drawings provide an example of the technical idea of the present disclosure for illustrative purposes only. That is, the disclosed aspects are intended to illustrate the scope of the technical idea of the present disclosure. Thus, the scope of the present disclosure is not limited to the aspects shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A display device comprising:
- a first driving transistor included in a first subpixel;
- a second driving transistor included in a second subpixel adjacent to the first subpixel, and the second driving transistor adjacent to the first driving transistor;
- a first shield metal disposed below the first driving transistor;
- a second shield metal disposed below the second driving transistor;
- a buffer layer disposed on the first shield metal and the second shield metal;
- an interlayer insulating film disposed on the buffer layer;
- a first source electrode included in the first driving transistor, disposed on the interlayer insulating film, and electrically connected to the first shield metal by a first through-hole in the interlayer insulating film and the buffer layer;
- a second source electrode included in the second driving transistor, disposed on the interlayer insulating film, and electrically connected to the second shield metal by a second through-hole in the interlayer insulating film and the buffer layer; and
- a welding repair line disposed between the buffer layer and the interlayer insulating film,
- wherein the welding repair line comprises a first portion overlapping with at least a part of the first shield metal, a second portion electrically connected to the second source electrode by a third through-hole in the interlayer insulating film, and a third portion disposed between the first portion and the second portion.

2. The display device of claim 1, wherein the first subpixel comprises a first scan transistor, and the second subpixel comprises a second scan transistor, and
- wherein the first scan transistor and the second scan transistor are connected to a single data line, and the first driving transistor and the second driving transistor disposed between the first scan transistor and the second scan transistor.

3. The display device of claim 1, wherein the first portion of the welding repair line is spaced apart from the first source electrode.

4. The display device of claim 1, further comprising a first emitting device receiving driving current from the first driving transistor,
- wherein the first portion of the welding repair line is electrically disconnected from the first shield metal.

5. The display device of claim 1, further comprising a first emitting device of the first subpixel receiving driving current from the second driving transistor,
- wherein the first portion of the welding repair line is electrically connected to the first shield metal.

6. The display device of claim 5, wherein a drain node or a source node of the first scan transistor in the first subpixel is electrically disconnected from a data line electrically connected to a drain node or a source node of the second scan transistor in the second subpixel.

7. The display device of claim 1, wherein the first source electrode comprises:
- a shield portion overlapping with at least a part of the first portion of the welding repair line, and
- a first pixel electrode included in the first emitting device of the first subpixel is disposed over the shield portion of the first source electrode, and
- wherein the shield portion of the first source electrode is disposed between the first pixel electrode and the first portion of the welding repair line, and the shield portion of the first source electrode overlaps with at least a portion of the first pixel electrode.

8. The display device of claim 1, wherein the welding repair line comprises a same material as the first shield metal and the second shield metal.

9. The display device of claim 8, wherein each of the first pixel electrode of the first emitting device in the first subpixel and the second pixel electrode of the second emitting device in the second subpixel has a first specific resistance, and
- each of the welding repair line, the first shield metal, and the second shield metal has a second specific resistance that is lower than the first specific resistance.

10. The display device of claim 1, wherein the first subpixel comprises a first storage capacitor configured by overlapping between the first shield metal and a first gate electrode of the first driving transistor,
- the first gate electrode comprises a first compensation pattern extending in a first direction so as to not overlap with the first shield metal and a second compensation pattern extending in a direction opposite the first direction so as to not overlap with the first shield metal,
- the first subpixel comprises a second storage capacitor configured by overlapping between the second shield metal and a second gate electrode of the second driving transistor, and
- the second gate electrode comprises a third compensation pattern extending in the first direction so as to not overlap with the second shield metal and a fourth compensation pattern extending in the direction opposite the first direction so as to not overlap with the second shield metal.

11. The display device of claim 10, wherein the first storage capacitor and the second storage capacitor are symmetric with respect to a boundary line between the first subpixel and the second subpixel.

12. The display device of claim 10, wherein a width of the first compensation pattern is equal to a width of the second compensation pattern, and a width of the third compensation pattern is equal to a width of the fourth compensation pattern.

13. The display device of claim 10, wherein an area size of the first compensation pattern is equal to an area size of the fourth compensation pattern, and an area size of the second compensation pattern is equal to an area size of the third compensation pattern, and
- Wherein the first storage capacitor and the second storage capacitor have a same capacitance.

14. The display device of claim 10, wherein an area size of the first compensation pattern is greater than an area size of the fourth compensation pattern, and an area size of the second compensation pattern is greater than an area size of the third compensation pattern, and
- wherein the first storage capacitor and the second storage capacitor have a same capacitance.

15. The display device of claim 10, wherein an area size of the first compensation pattern is smaller than an area size of the fourth compensation pattern, and an area size of the second compensation pattern is greater than an area size of the third compensation pattern, and wherein the first storage capacitor and the second storage capacitor have a same capacitance.

16. The display device of claim 1, wherein the welding repair line comprises a first metal being a same metal of a gate electrode of each of the first driving transistor and the second driving transistor, the first source electrode and the second source electrode comprise a second metal different from the first metal, and the first shield metal and the second shield metal comprise the first metal.

17. A display device comprising:

a substrate;

a first shield metal over the substrate;

a buffer layer on the first shield metal;

an interlayer insulating film on the buffer layer;

a first source electrode included in the first driving transistor, disposed on the interlayer insulating film, and electrically connected to the first shield metal by a first through-hole in the interlayer insulating film and the buffer layer;

an insulating layer on the first source electrode;

a first pixel electrode disposed over the insulating layer and electrically connected to the first source electrode by a second through-hole in the insulating layer; and a welding repair line disposed between the buffer layer and the interlayer insulating film, wherein a portion of the welding repair line interposed between the first shield metal and the first source electrode overlaps with at least a part of the first pixel electrode.

18. The display device of claim 17, wherein the first shield metal and the welding repair line are electrically disconnected.

19. The display device of claim 17, further comprising a welding connection pattern connecting the interposed portion of the welding repair line and the first shield metal, wherein the first source electrode comprises a shield portion extending to overlap with at least a part of the welding connection pattern.

20. The display device of claim 17, wherein the welding repair line includes a same material as the first shield metal.

* * * * *